(12) United States Patent
Nielsen

(10) Patent No.: US 7,986,831 B2
(45) Date of Patent: Jul. 26, 2011

(54) IMAGE PROCESSING APPARATUS, IMAGE PROCESSING METHOD AND COMPUTER PROGRAM

(75) Inventor: Frank Nielsen, Tokyo (JP)

(73) Assignee: Sony Corporation, Tokyo (JP)

( * ) Notice: Subject to any disclaimer, the term of this patent is extended or adjusted under 35 U.S.C. 154(b) by 1002 days.

(21) Appl. No.: 11/895,735

(22) Filed: Aug. 27, 2007

(65) Prior Publication Data

US 2008/0056572 A1 Mar. 6, 2008

(30) Foreign Application Priority Data

Aug. 29, 2006 (JP) ................................ 2006-232582

(51) Int. Cl.
*G06K 9/34* (2006.01)
*G06K 9/36* (2006.01)
(52) U.S. Cl. ........ 382/164; 382/173; 382/180; 382/276; 382/289
(58) Field of Classification Search .................. 382/164, 382/173, 180, 276, 289
See application file for complete search history.

(56) References Cited

U.S. PATENT DOCUMENTS

| 5,974,199 A * | 10/1999 | Lee et al. ....................... 382/289 |
| 6,606,408 B1 * | 8/2003 | Kang et al. .................... 382/164 |
| 6,738,154 B1 * | 5/2004 | Venable ........................ 358/1.15 |
| 6,898,316 B2 * | 5/2005 | Zhou ............................. 382/190 |
| 2003/0059111 A1 * | 3/2003 | Druitt et al. .................... 382/173 |
| 2004/0181749 A1 * | 9/2004 | Chellapilla et al. ............ 715/505 |
| 2009/0175543 A1 * | 7/2009 | Nielsen ......................... 382/204 |

FOREIGN PATENT DOCUMENTS

| JP | 09128561 A | * | 5/1997 |
| JP | 2000 228722 | | 8/2000 |
| JP | 2003 283909 | | 10/2003 |
| JP | 2005 275447 | | 10/2005 |
| JP | 2005 277732 | | 10/2005 |

OTHER PUBLICATIONS

Nielsen, F.—"Interactive point-and-click segmentation for object removal in digital images"—HCI/ICCV 2005—2005, pp. 131-140.*
Adorni, G.—"Cellular automata based inverse perspective transform as a tool for indoor robot navigation"—AIIA 99: Advances in Artificial Intelligence—2000, pp. 345-355.*
T. H. Cormen, C. E. Leiserson, R. L. Rivest "Data Structures for Disjoint Sets (Oct. 10 and 15)" Fall 2002, pp. 1-7.
Frank Nielsen, "Visual Computing: Geometry, Graphics, and Vision" Chapter 2, p. 26-28, 2005.
Frank Nielsen, "Visual Computing: Geometry, Graphics, and Vision" chapter 3, Coordinate Pipelines, p. 127-138, 2005.
Frank Nielsen, "Visual Computing: Geometry, Graphics, and Vision" chapter 4, Images, p. 203-204, 2005.
John Hershberger and Jack Snoeyink, Speeding up the Douglas-Peucker Line-Simplification Algorithm, chapter 5, p. 1-16, 1992.
Frank Nielsen et al., ClickRemoval: Interactive Pinpoint Image Object Removal. pp. 315-318 (2005).

* cited by examiner

*Primary Examiner* — Bhavesh M Mehta
*Assistant Examiner* — Bernard Krasnic
(74) *Attorney, Agent, or Firm* — Frommer Lawrence & Haug LLP; William S. Frommer

(57) ABSTRACT

An image processing apparatus for extracting pictures-in-picture information contained in an image, includes an image segmentation unit segmenting an input image into regions, and a region extraction unit extracting a pictures-in-picture region containing the pictures-in-picture information on the basis of a contour of a segmented region.

18 Claims, 22 Drawing Sheets

FIG. 1A
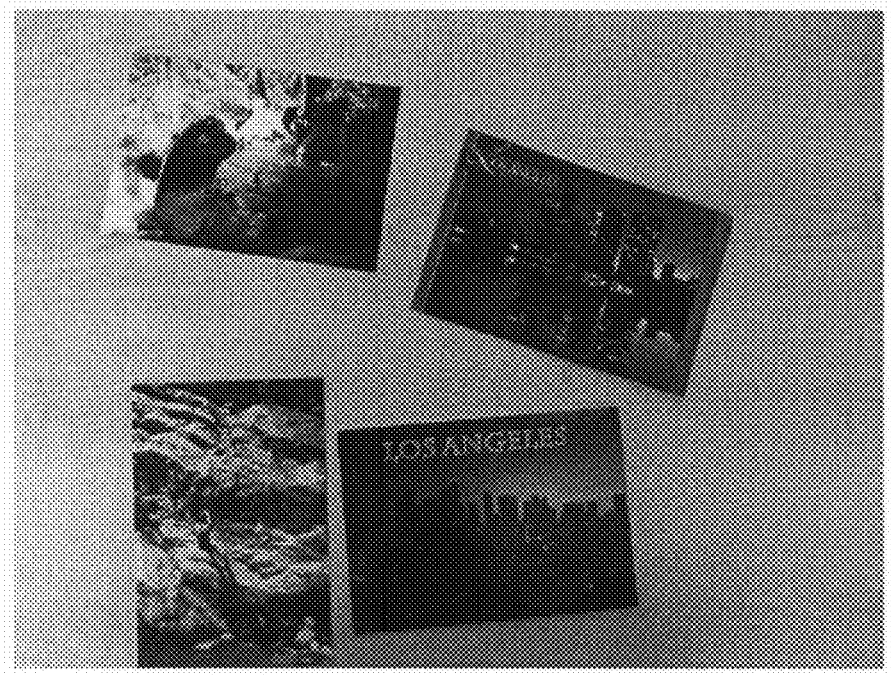
FIG. 1B
 
 

— Boundary Edge
— Internal Edge

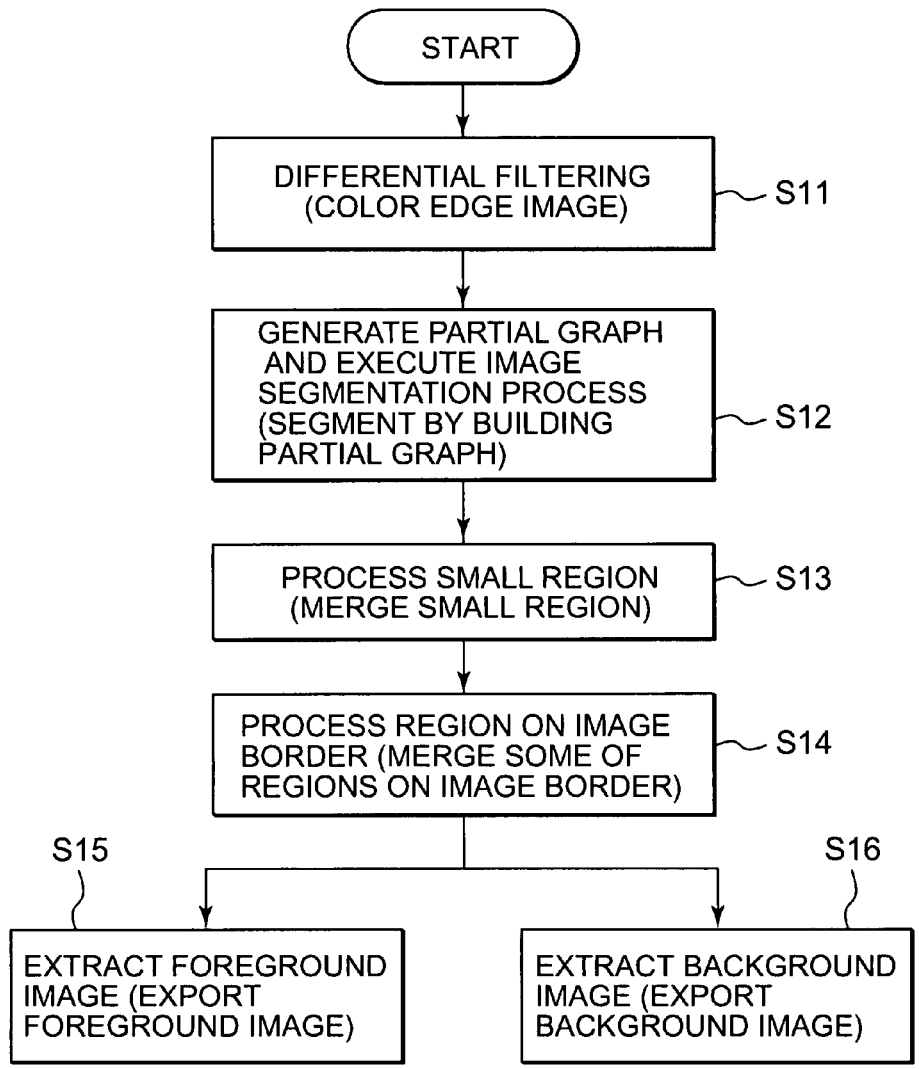

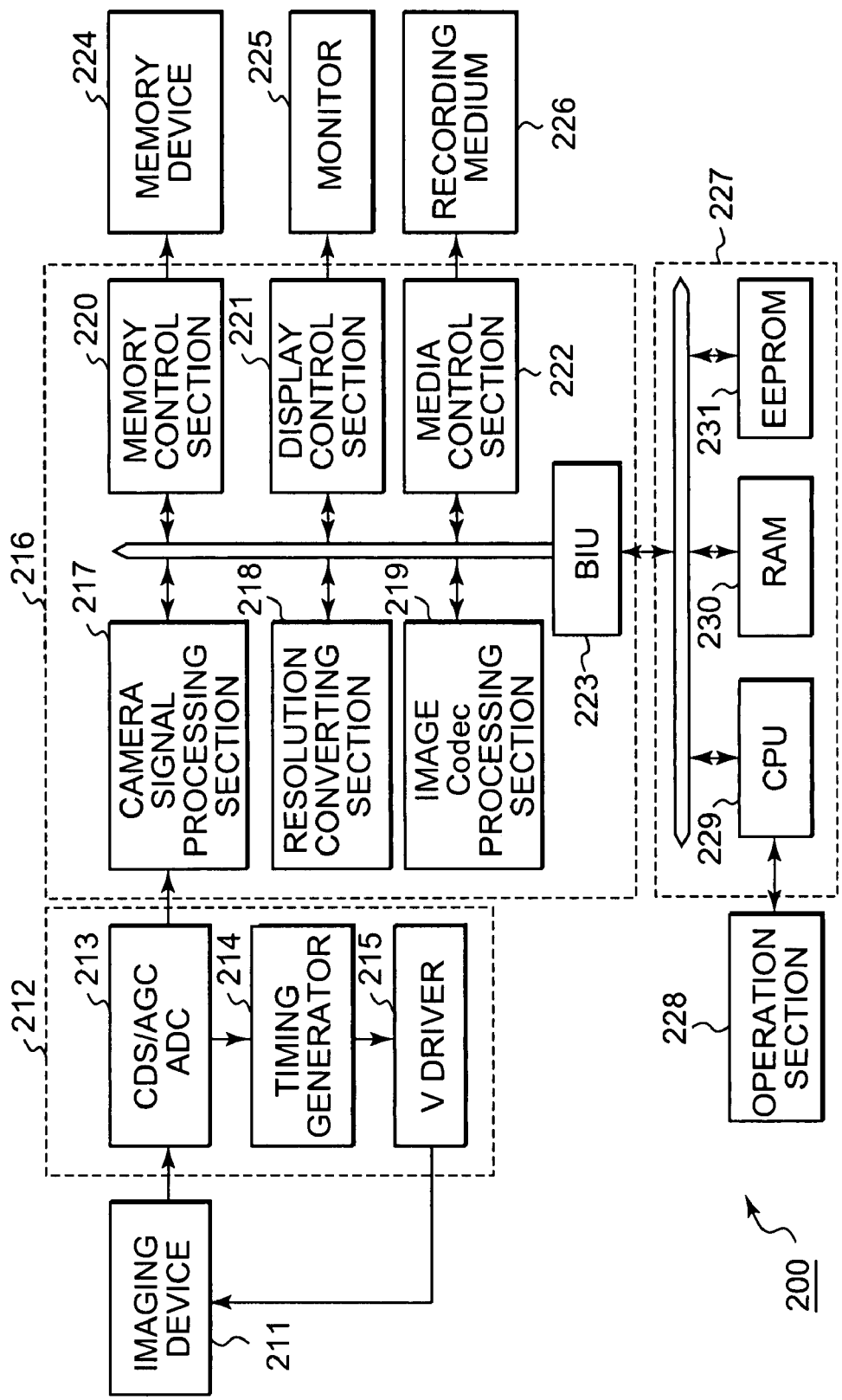

US 7,986,831 B2

IMAGE PROCESSING APPARATUS, IMAGE PROCESSING METHOD AND COMPUTER PROGRAM

CROSS REFERENCES TO RELATED APPLICATIONS

The present document contains subject matter related to Japanese Patent Application No. 2006-232582 filed in the Japanese Patent Office on Aug. 29, 2006, the entire content of which being incorporated herein by reference.

BACKGROUND OF THE INVENTION

1. Field of the Invention

The present invention relates to an image processing apparatus, an image processing method, and a computer program that process a digital image, and particularly to an image processing apparatus, an image processing method, and a computer program that process images of objects contained in an image taken by a digital camera.

More specifically, the present invention relates to an image processing apparatus, an image processing method, and a computer program that process pictures-in-picture information contained in a digital image, and particularly, to an image processing apparatus, an image processing method, and a computer program that extract, from a digital image containing a plurality of pictures-in-picture information items, each pictures-in-picture document by separation from a background image.

2. Description of Related Art

Recently, digital cameras are extensively used, which digitally encoded images taken by a solid-state imager, such as a CCD (Charge Coupled Device) or CMOS (Complementary Metal-Oxide Semiconductor) sensor. When compared with cameras with a silver salt film or a photosensitized plate, the digital cameras are advantageous in their capability of storing digitally encoded images into a memory so that the images be processed and managed by a computer, along with their being free from an issue of film's life time.

The digital cameras are usually used to take images of scenery and persons, but can also be used to digitize pictures-in-picture information. For example, pictures-in-picture information, such as documents including paper documents and business cards, a blackboard and a whiteboard whereon information is written for a presentation or a conference, or a screen image projected by a projector can be digitally inputted through a digital camera, for making it available for various image processing including, e.g., storage and management of information.

For example, an imaging apparatus having a business card capturing function has been proposed (see, e.g., Japanese Patent Application Publication No. JP 2003-283909). This imaging apparatus is configured to automatically zoom in on a business card to image the business card in almost the same size as the imaging angle of view.

Furthermore, an electronic camera has been proposed, which extracts textual information from an image signal obtained by imaging an object such as a business card or a signboard for conversion into a textual character string, and stores the textual information by classification on the basis of a predetermined item recognized from the textual character string (see, e.g., Japanese Patent Application Publication No. JP 2005-275447), whereby business card data can be easily managed without initial investment or cumbersome labor.

Furthermore, a digital image is split into foreground objects such as pictures in picture and a background, and only a pictures-in-picture region is extracted for use as a single photo image. The inventor of the present application calls "PicsInPic" the technology for extracting or exporting another photo image contained in a photo image.

In the related art, it has been typical practice to extract a contour of an image object such as a picture in picture on the basis of an edge image obtained by differential-processing a source image, to cut out the image object from a background image. For example, an image processing apparatus has been proposed, in which straight lines are detected from an edge image for imaging using Radon conversion, and a quadrilateral forming a contour for an imaging object is formed from the detected straight line parameters, for projective transformation to obtain an image which is formed as if the object for imaging were imaged from the front (see, e.g., Japanese Patent Application Publication No. JP 2005-275447).

SUMMARY OF THE INVENTION

However, for extraction of a contour using an edge image, an absolute contrast must be found between a picture in picture and its background. If edge information is contained in the background and the picture in picture itself, it becomes difficult to extract the contour accurately. For example, it is difficult to extract a photo placed on a patterned carpet. It is also difficult to extract, from a digital image containing a plurality of picture in picture, each picture in picture image one by one.

Accordingly, it is desirable to provide an image processing apparatus, image processing method, and computer program, which can suitably process one or more object images contained in a digital image, such as an image taken by a digital camera.

Furthermore, it is also desirable to provide an image processing apparatus, image processing method, and computer program, which can perform extraction processing on one or more picture-in-picture images contained in a digital image after separating them from a background image.

Furthermore, it is also desirable to provide an image processing apparatus, image processing method, and computer program, which can accurately extract various pictures-in-picture information such as photos, business cards, and/or book covers contained in a digital image, from a complicated background image.

The present invention has been made in view of the above circumstances. In one embodiment of the present invention, there is provided an image processing apparatus for extracting pictures-in-picture information contained in an image, which includes image segmenting means for segmenting an input image into regions, and region extracting means for extracting a pictures-in-picture region containing the pictures-in-picture information on the basis of a contour of a segmented region.

The image processing apparatus may further include a quadrilateral detecting means for detecting a quadrilateral from the pictures-in-picture region extracted by the region extracting means, and image converting means for subjecting the detected quadrilateral region to inverse projective transformation such that the region look like an image viewed from the front, and adjusting an aspect ratio thereof.

By extracting a pictures-in-picture region from a photo image taken by a digital still camera, the extracted image object, and further textual information such as text contained in the image are recognized, whereby various services can be provided.

However, in the related-art method in which the contour of a picture in picture is extracted using an edge image obtained by differential-processing a source image for separation from a background image, it is assumed that there is an absolute contrast between the picture in picture and the background. If edge information is contained in the background or the picture in picture itself, it becomes difficult to extract the contour accurately. For example, it is difficult to extract a photo placed on a patterned carpet. It is also difficult to extract, from a digital image containing a plurality of pictures in picture, individual pictures in picture one by one.

By contrast, in the image processing apparatus according to the present embodiment, the image segmenting means handles an input image in the form of an incidence graph. The incidence graph describes image information by treating an image component unit, such as a pixel or a polygon formed from a cluster of pixels as a node, and connecting adjacent nodes by an edge. Further, a weight factor is given to the edge on the basis of a result of comparison between attribute values of each node connected by the edge, and those edges in the incidence graph are sorted on the basis of their weights. Then, a pair of the nodes with the edge in between is extracted in sorted order of the edges, and whether or not the pair of nodes should be merged is evaluated on the basis of a statistical processing algorithm, and performs a merge processing on the nodes. By repeating such merge processing, the input image is segmented into a plurality of image regions.

In other words, the image segmenting means judges whether or not the adjacent nodes should be merged on the basis of the statistical processing algorithm, and by repeating merging of the nodes, a node can be grown into a small, discernible unit called a segment, from raw data formed from a multitude nodes each of which is not discernible. In the statistical processing algorithm herein used, it is judged whether adjacent nodes are similar, i.e., adjacent nodes can be merged, on the basis of a predicate derived from a phenomenon of concentration inequality in, e.g., attribute information each node has.

Since the merge processing on the nodes based on the statistical processing algorithm mentioned above involves simple computation of, e.g., statistically processing the attribute information of each node, high-speed processing can be implemented. For example, some millions of polygons can be processed per second using general computing machines, such as personal computers. Furthermore, by adjusting a parameter value contained in the predicate, a criterion for merging nodes can be set arbitrary to produce a segment having a desired coarseness, and thus, the system has scalability.

Therefore, according to the present embodiment, using the topology of a plurality of nodes forming raw data as an input value, nodes are merged recursively (i.e., mesh-grown) according to the statistical processing algorithm, whereby a segment having an arbitrary coarseness can be produced. Furthermore, by changing the parameter value of the predicate based on the statistical processing algorithm, the input image can be segmented such that each of the segments has a coarseness optimized for extracting pictures-in-picture regions contained in a digital image or for separating a foreground region including pictures in picture from a background region excluding the foreground region.

It should be noted that, if pictures in picture have complicated texture, or if a background on which the pictures in picture are placed has texture, each of the pictures-in-picture regions are also segmented to lose its single body, or the background is also segmented to be undistinguished from the pictures-in-picture regions. Hence, the image segmenting means may not operate satisfactorily.

In an embodiment of the present invention, the image segmenting means may perform first image segmenting processing for exporting a foreground region including individual pictures in picture from a source image, and second image segmenting processing for exporting a background region other than the pictures in picture from the source image, in a two-step manner, whereby to improve image segmenting accuracy.

The image processing apparatus further includes a differential processing means for differential-processing the input image. The incidence graph creating means assign, only to a pixel which frequency band is less than a predetermined value in a differentiated image outputted from the differential processing means (or which does not correspond to the contour of a pictures-in-picture region or of a texture region), an edge for connection with another pixel, to create a partial incidence graph. No adjacent pixels could be merged without an edge, and thus the image segmentation proceeds with such adjacent pixels left separated.

Therefore, the merge processing means can merge nodes on a border to merge the background into a single region. As a result, the image processing apparatus can export the foreground image region including the pictures in picture, and export the background image region on which the pictures in picture are placed, to output each of the foreground and background images.

Furthermore, after having performed the image segmentation processing by an image segmenting mean, still another small region may be contained in a resultant segmented region. However, a small region contained in another region is basically individual content contained in pictures-in-picture information, and thus only a region defined by the outermost contour needs to be considered. Hence, the region extracting means discards such a small region.

Furthermore, in another embodiment of the present invention, there is provided a computer program described in a computer-readable form for execution on a computer of processing for extracting pictures-in-picture information contained in an image. The computer program causes the computer to execute:

an image segmenting processing for segmenting an input image into regions;

a region extracting processing for extracting a pictures-in-picture region containing the pictures-in-picture information on the basis of a contour of a segmented region;

a quadrilateral detecting processing for detecting a quadrilateral from the pictures-in-picture region extracted in the region extracting procedure; and an image converting processing for subjecting the detected quadrilateral region to inverse projective transformation so that the region looks like an image viewed from the front, and adjusting an aspect ratio thereof.

The computer program according to the present embodiment is obtained by defining a computer program described in a computer readable form such that predetermined processing is executed on a computer system. In other words, when the computer program according to the present embodiment is installed in the computer system, collaborative operations are performed on the computer system, whereby advantages similar to those provided by the image processing apparatus according to the above-described embodiment can be obtained.

According to the embodiments of the present invention, an image processing apparatus, image processing method, and computer program can be provided, which can perform extracting processing of one or more pictures in picture contained in a digital image from a background image.

Furthermore, according to the embodiments of the present invention, an image processing apparatus, image processing method, and computer program can be provided, which can accurately extract various pictures in picture, such as photos, business cards, and/or book covers, contained in a digital image from a complicated background image.

Further objects, features and advantages of the present invention will become apparent from a more detailed description that is based on a later-described embodiment of the present invention and accompanying drawings.

BRIEF DESCRIPTION OF THE DRAWINGS

FIG. 1A is a diagram showing an example of a digital image containing a plurality of pictures-in-picture images;

FIG. 1B is a diagram showing a state in which the individual pictures-in-picture image contained in the digital image shown in FIG. 1A are extracted;

FIG. 15 is a flowchart showing an overview procedure for two-step image segmentation;

FIG. 24 is a diagram showing a configuration of a digital still camera according to an embodiment of the present invention.

DETAILED DESCRIPTION OF THE EMBODIMENT

Figure 2:
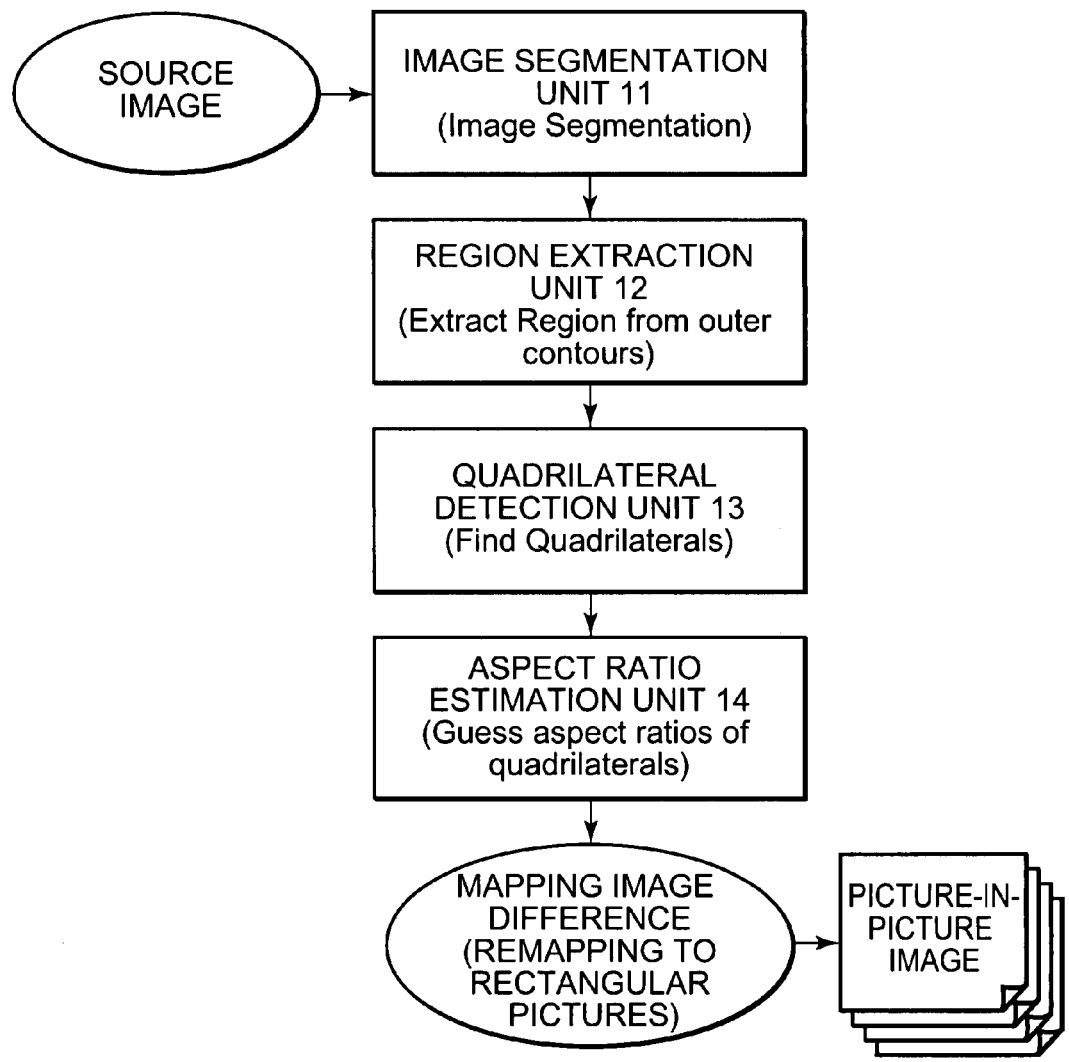
FIG. 2 is a block diagram schematically showing a configuration of an image processing function.

An embodiment of the present invention will be described below in details with reference to the accompanying drawings.

In the field of image processing, it is typical practice to represent image data formed from nodes, each being a pixel (or a polygon mesh formed from a cluster of pixels) in the form of an incidence graph (or a region adjacent graph (RAG)) that describes a connectivity relationship between adjacent nodes. The present embodiment is configured to describe a digital image in the form of an incidence graph formed from a plurality of nodes and edges for connecting nodes, and image-segment the original digital image through repeatedly merging the nodes connected by the corresponding edges, to finally separate image regions of pictures in picture, such as postcards, business cards, and/or book covers, contained in the digital image, from the background image. For example, if a source digital image is 8-MB image data containing four pictures in picture, as shown in FIG. 1A, four image data items each having a size of about 1 MB can be extracted by separation from the background as shown in FIG. 1B, according to an embodiment of the present invention.

In an image processing method according to an embodiment of the present invention, it is configured to recognize each pictures in picture contained in a digital image, and then gradually define each of the pictures in picture as an image region to generate the picture, using image data described in the form of an incidence graph. Furthermore, quadrilaterals contained in a source digital image are subjected to projective transformation to be converted to appropriate rectangular regions. In order to extract individual pictures accurately from a patterned background image, a system must be robust and capable of high-speed processing.

When an embodiment of the present invention is applied to, e.g., a digital camera, the digital camera can image, pictures-in-picture information such as documents including paper documents and business cards, or information written on a blackboard or a whiteboard or on a screen projected by a projector in a presentation or in a meeting, and then extract pictures in picture contained in the photo image taken. FIG. 24 shows a configuration of a digital still camera according to an embodiment of the present invention.

A digital still camera 200 shown in the figure includes an imaging device 211, a preprocessing unit 212, and a camera/digital signal processing (DSP) unit 216.

The imaging device 211 has pixels, each having a photoelectric conversion effect such as a CCD or CMOS, arranged two-dimensionally, and, e.g., an RGB color coding single plate is disposed on the light-receiving side. Signal charges equivalent to an amount of incident light passing through each of the corresponding color filters are stored in each pixel, and from an amount of charges in each color signal read from the pixel, the color of the incident light at the pixel position can be reproduced.

The preprocessing unit 212 has a CDS/AGC/ADC block 213, a timing generator 214, and a V driver 215.

The CDS/AGC/ADC block 213 performs correlated double sampling (CDS) to highly accurately suppress small noise in a pixel signal receives from the imaging device 211, thereafter converts the resultant signal into digital signals, and further performs AGC (Automatic Gain Control) for proper gain control.

The timing generator 214 generates a timing pulse signal for driving the imaging device 211. The V driver 215 outputs a drive signal for outputting charges stored in the respective pixels of the imaging device 211 per each line at a time vertically, according to this timing pulse signal.

The camera DSP unit 216 has a camera signal processing section 217, a resolution converting section 218, an image codec processing section 219, a memory control section 220, a display control section 221, and a media control section 222.

The camera signal processing section 217 performs white balance gain control on an image signal supplied thereto from the preprocessing unit 212 by AWB (Auto White Balance) to reproduce a proper color condition, and further produces an RGB image signal by demosaic processing. Also, the camera signal processing section 217 performs γ correction on the RGB image signal, and converts the image information into a tone suitable for output to a monitor, printing, or image recording.

The resolution converting section 218 changes the image size. The image codec processing section 219 performs color space conversion of the RGB image signal into a luminance signal and a color difference signal (Y/Cr/Cb), and also performs coding such as JPEG (Joint Picture Experts Group) compression.

The memory control section 220 controls access operation for writing and reading data such as captured image information from a memory device 224, such as an SDRAM (Synchronous DRAM).

The display control section 221 controls the driving of a monitor display 225, such as an LCD (Liquid Crystal Display), and outputs the photo images held in, e.g., the memory device 224, for display.

The media control section 222 has a slot for inserting a detachable recording medium 226, such as a memory stick (registered trademark), and writes/reads data to and from the recording medium 226. For example, it records photo image files held in the memory device 224, on the recording medium 226.

Furthermore, the camera DSP unit 216 is connected to a control unit 227 with a bus interface unit (BIU) 223 inbetween. The control unit 227 includes an operation section 228 through which a user instructs shutter button operation, zooming, and other camerawork, a CPU 229 that totally controls the operation of the entire apparatus in response to a user operation, a RAM 230 being a main storage memory for the CPU 229, an EEPROM (Electrically Erasable and Programmable ROM) 231 that holds program codes, apparatus information, and the like in a nonvolatile manner.

FIG. 2 schematically shows a configuration of an image processing function that is incorporated into the digital camera shown in FIG. 1 for extraction of pictures-in-picture regions from a digital image. Each function module forming the image processing function shown in the figure is actually realized by predetermined program codes executed on the CPU.

The image processing function shown in the figure may be designed as a dedicated hardware device, but may also be realized as applications incorporated into the digital camera 200. Alternatively, it may be realized in the form of starting an application program that executes processing corresponding to each of function modules 11-14 on a typical computing system such as a personal computer (PC) that captures photo images from the digital camera. The typical computing system uses, e.g., Pentium (registered trademark) IV (1.6 GHz) by Intel Corporation of the United States as its processor, and has a main memory such as a 1-GB RAM. Also, the application programs can be coded in the C++ programming language by utilizing, e.g., an API (Application Programming Interface) provided by an Open GL.

The image processing function shown in the figure has an image segmenting unit 11 that performs segmenting processing on image regions using an incidence graph, a region extracting unit 12 that extracts regions from outer contours, a quadrilateral finding unit 13 that finds quadrilaterals forming pictures in picture from segmented images, and an aspect ratio guessing unit 14 that estimates the original aspect ratio of each quadrilateral, and reassigns the quadrilaterals into a rectangular region in accordance with the guessed aspect ratio, to output one or more pictures (pictures in picture).

Figure 3:
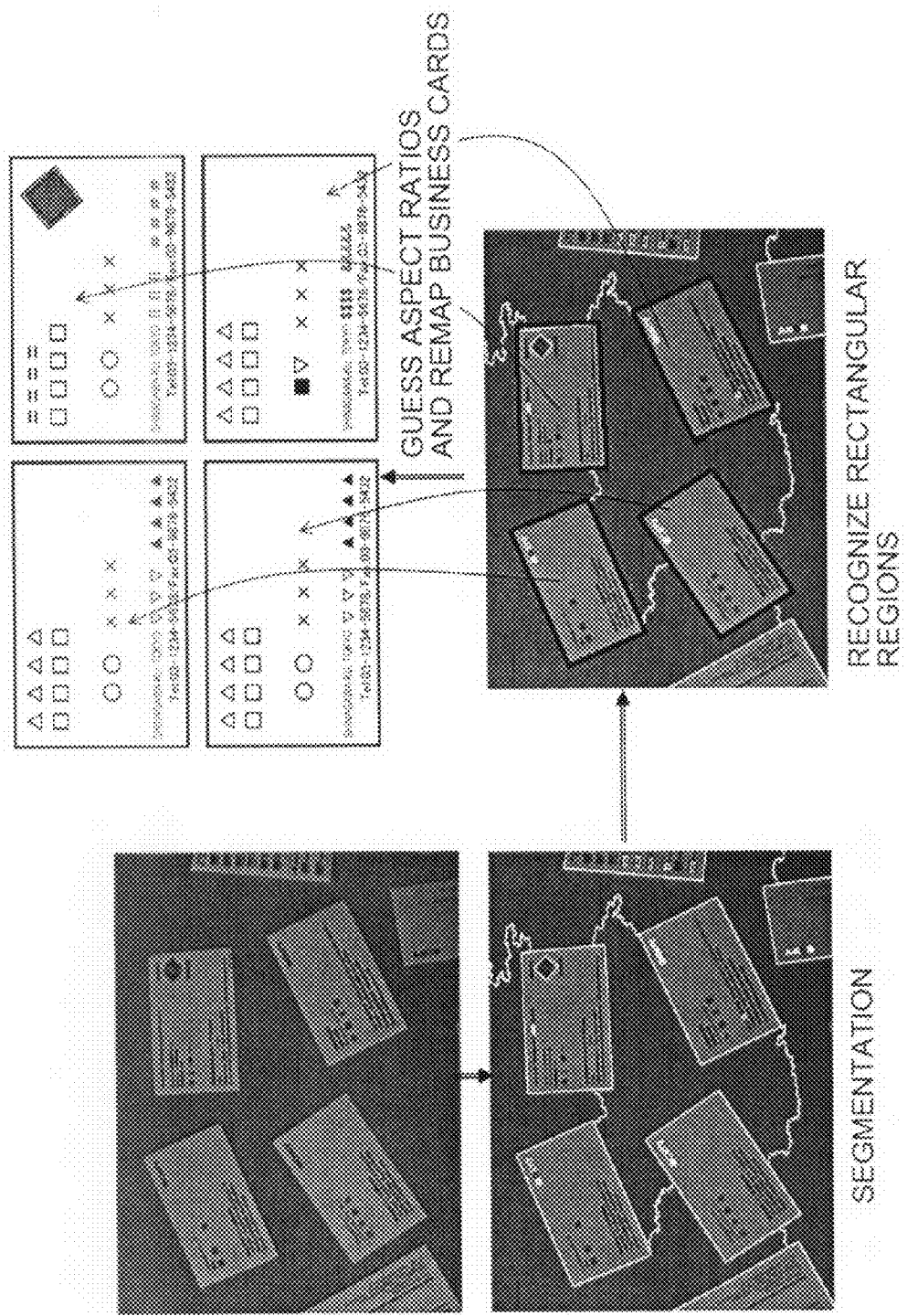
FIG. 3 is a diagram showing how rectangular regions are recognized from an image obtained by image-segmenting a digital image obtained by taking a picture of plural business cards, and the individual business card images are then remapped.

FIG. 3 shows how a rectangular region is recognized from an image obtained by segmenting a digital image in which a plurality of business cards are imaged, and then the individual business card images are remapped. Such an application could be a sort of substitute technology for an OCR (Optical Character Recognizer).

Figure 4A:
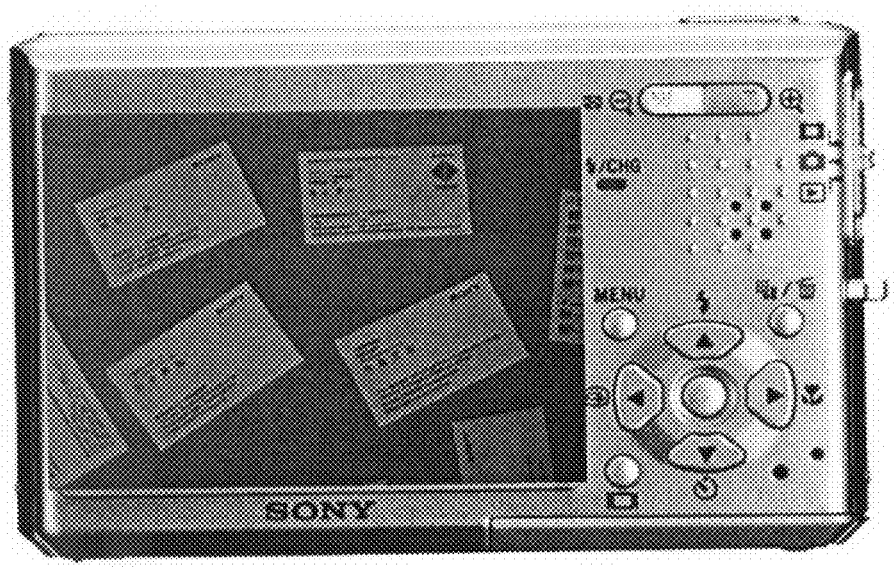
FIG. 4A is a diagram showing an example of how a digital image formed in an image-capturing mode is displayed.
Figure 4B:
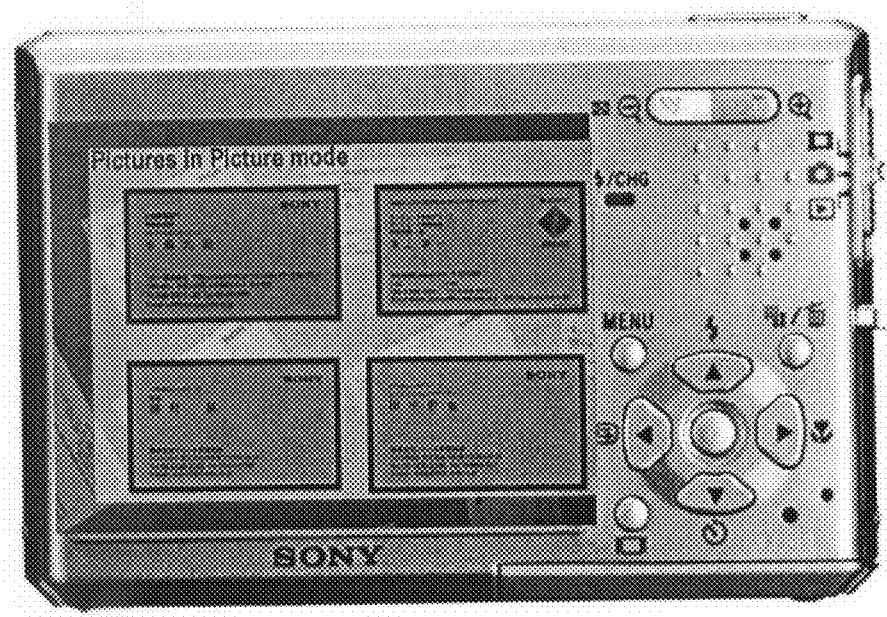
FIG. 4B is a diagram showing an example of how a digital image formed under a pictures-in-picture display mode is displayed.

For example, if this technology is incorporated into a digital camera, in a normal imaging mode, an actual image in which a plurality of business cards are scattered is displayed in a view finder as shown in FIG. 4A. Meanwhile, in a picsinpic (pictures-in-picture display) mode, images obtained by reassigning the recognized individual business cards at a predetermined aspect ratio are neatly arranged.

Figure 5A:
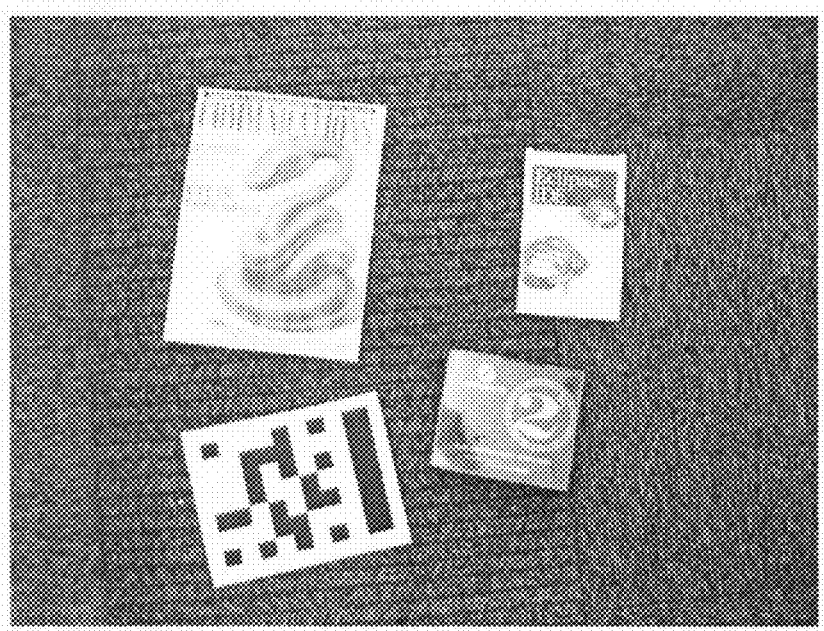
FIG. 5A is a diagram showing a digital image formed by taking a picture of books scattered over a carpet.
Figure 5B:
FIG. 5B is a diagram showing a pictures-in-picture image extracted from the digital image shown in FIG. 5A.
Figure 5C:
FIG. 5C is a diagram showing a result of an information search made on the basis of character string information contained in the pictures-in-picture image shown in FIG. 5B.

Furthermore, according to the image processing function shown in FIG. 2, book covers can be processed as pictures in picture, in addition to business cards. As shown in FIG. 5A, a region of a digital image in which books scattered across a carpet are imaged is segmented using an incidence graph, to extract a region of each book through its outer contour as shown in FIG. 5B. Furthermore, as shown in FIG. 5C, the image of each extracted region is captured into networked information equipment such as a computer, whereby the book cover image is character-recognized to read its book title or character string information such as its ISBN (International Standard Book Number) for database search. Still furthermore, on the basis of a result of the database search, links with other service applications, such as online shopping to purchase books, discussion over blogS, provision of other additional information, and the like can be implemented.

Figure 6:
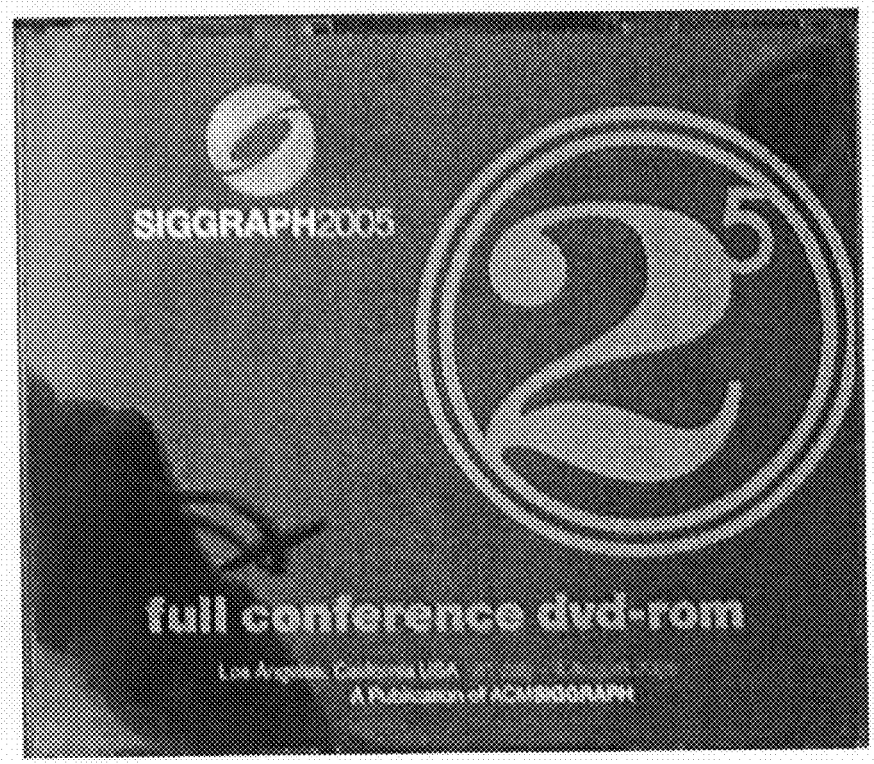
FIG. 6 is a diagram showing how an extracted quadrilateral region is remapped to a rectangular region at the aspect ratio of a jacket.

Furthermore, if, from a result of a database search made on character string information contained in a quadrilateral extracted from a digital image in which various pictures in picture are scattered, it is found out that the corresponding picture in picture is a jacket of a medium such as a CD or a DVD, the extracted quadrilateral can be remapped into a rectangular region at the aspect ratio of the jacket, as shown in FIG. 6.

Below, the various units 11 to 14 forming the image processing function shown in FIG. 2 will be described in great detail.

Image Segmentation

Figure 7:
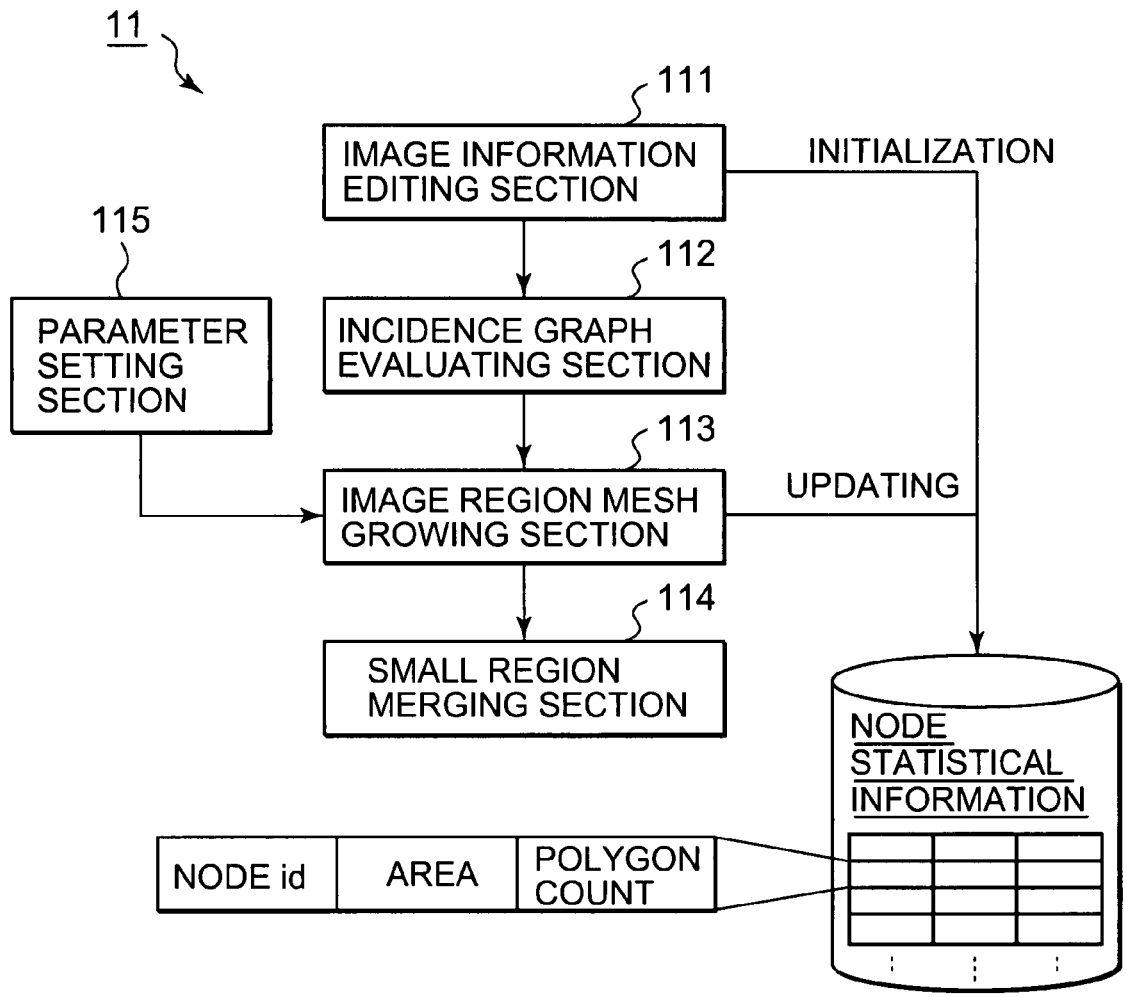
FIG. 7 is a diagram showing an internal configuration of an image segmenting unit 11.

FIG. 7 shows an internal configuration of the image segmenting unit 11. The image segmenting unit 11 shown in the figure has an image information editing section 111 that edits three-dimensional image information for processing into the form of an incidence graph, an incidence graph evaluating section 112 that evaluates each edge of the inputted incidence graph for sorting, an image region mesh-growing section 113 that extracts image region pairs, each consisting of image regions sandwiching an edge, in sorted order of the edges, for evaluation on the basis of a statistical processing algorithm to perform mesh growing thereon, and a small region merging section 114 that merges a small region remaining after the image regions are mesh-grown.

In the field of image processing, it is typical to represent a polygon mesh as an image region in the form of an incidence graph (or a regional adjacent graph (RAG)) that describes a relationship among a plurality of polygons forming the polygon mesh. Several specific methods are available for describing an incidence graph. An incidence graph is formed from a plurality of nodes and edges, each connecting between the corresponding nodes. What to use for a node and an edge depend on each case. For example, if a polygon is used as a node, a side or a vertex of the polygon can be an edge. If a side of a polygon is used as a node, a vertex of the polygon or the polygon can be an edge. If a vertex of a polygon is used as a node, a side of the polygon or the polygon can be an edge.

In the present embodiment, an incidence graph is formed using a polygon as a node, and a side of the polygon as an edge. Namely, the image information editing section 111 uses as its input data an incidence graph that is described by using polygons forming a polygon mesh as nodes, and by connecting corresponding nodes through an edge being a side on which the adjacent polygons touches each other.

Here, a method of creating an incidence graph will be described.

First, polygons $T_i$, $T_j$ belonging to an image region for processing are associated with nodes $N_i$, $N_j$. And between the nodes $N_i$ and $N_j$, if there is only one side belonging to the polygons $T_i$ and $T_j$ respectively corresponding to both nodes, the side is produced as an edge $e_{ij}$ connecting between both nodes.

An incidence graph can be directly built from index arrays of vertices and surfaces, by sorting polygons according to their edge endpoints. Sides, i.e., edges belonging to each polygon are classified into boundary edges demarcating a polygon mesh, i.e., an image region, and interior edges, each not touching the polygon mesh but touching an adjacent polygon inside the polygon mesh. Since the boundary edge of image region belongs to only one polygon, only the interior edges (other than boundary) are to be processed. Only the index arrays of vertices and surfaces suffice for this processing, and thus complicated incidence data structure, such as half-edge and quad-edge, is not needed.

Figure 8:
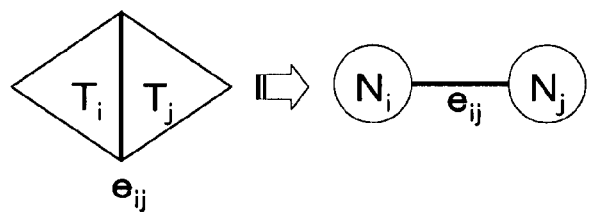
FIG. 8 is a diagram showing an example of the simplest incidence graph.

FIG. 8 shows an example of the simplest incidence graph. A polygon mesh shown on the left of the figure consists of two triangles $T_i$ and $T_j$ that touches with a side, i.e., an edge $e_{ij}$ in between. An incidence graph describing this polygon mesh consists of, as shown on the right of the figure, two nodes $N_i$ and $N_j$ respectively corresponding to the triangles $T_i$ and $T_j$, and the edge $e_{ij}$ connecting both nodes.

Figure 9:
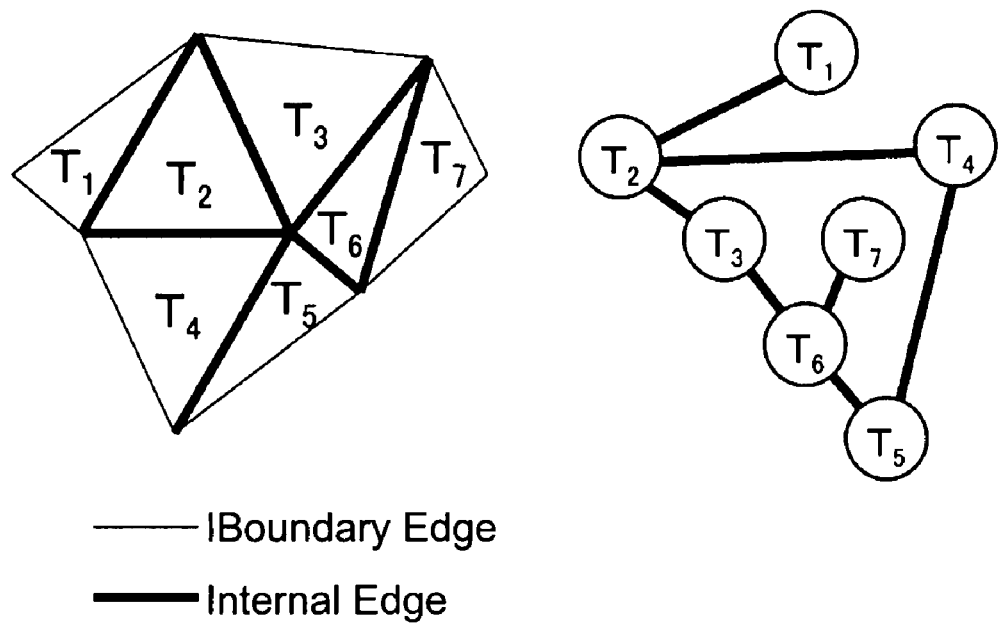
FIG. 9 is a diagram showing a configuration example of a somewhat complicated incidence graph.

Furthermore, FIG. 9 shows an example of a somewhat complicated incidence graph. A polygon mesh shown on the left of the figure consists of seven triangles $T_1$ to $T_7$, in which $T_1$ touches $T_2$, $T_2$ touches $T_1$, $T_3$, and $T_4$, $T_3$ touches $T_2$ and $T_6$, $T_4$ touches $T_2$ and $T_5$, $T_5$ touches $T_4$ and $T_6$, and $T_6$ touches $T_3$, $T_5$, and $T_7$. An incidence graph describing this polygon mesh is formed, as shown on the right of the figure, by connecting between nodes respectively corresponding to the triangles through the sides, i.e., edges belonging to adjacent triangles.

Note that a node is initially a pixel or a polygon being the smallest unit of a polygon mesh in a two-dimensional image, or that for a three-dimensional image, a voxel is a node. As merge processing on an image proceeds, a node grows into an image region formed from a polygon mesh that includes a plurality of polygons (or pixels or voxels). During the course of the image processing shown in FIG. 2, "node statistical information" is held for each node $N_i$. The node statistical information includes identification information $id(N_i)$ for uniquely identifying the node, an area $(N_i)$ of the associated image region (initially a single polygon), and a polygon count $n(N_i)$ (initial value set to 1) being the number of polygons forming the associated image region, i.e., polygon mesh. The reason why the area and polygon count are held for each node is that they are information necessary for judging whether the node, i.e., the associated image region is successfully merged or not, using a predicate based on a statistical processing algorithm.

The incidence graph evaluating section 112 evaluates each edge of the inputted incidence graph for sorting. Specifically, edge evaluation involves comparing attribute values of each image region connected through an edge to give a weight to the edge on the basis of the comparison result, and edges in the incidence graph are then sorted on the basis of their weight values. An image region herein used includes a polygon being the smallest unit, and an image region configured as a polygon mesh obtained by merging a plurality of polygons.

Using the area (an average value of the areas of all polygons merged into an image region) of, e.g., an image region as an attribute value, a difference between the areas of image regions connected through each edge is given as a weight value, for sorting in increasing order of the weights. In this case, the smaller the difference between the areas of image regions is, the smaller the weight value is, and the higher the processing priority in the subsequent image merge processing will be.

Figure 10:
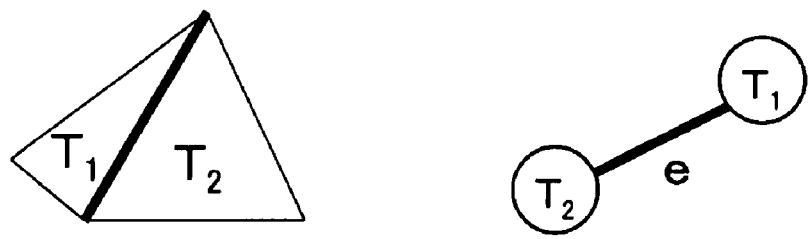
FIG. 10 is a diagram for explaining an edge evaluating processing method.

FIG. 10 illustrates an edge evaluating processing method. Here, two triangles $T_i$ and $T_j$ touching on an edge $e_{ij}$ are considered. Their incidence graph is, as shown on the right of the figure, formed from two nodes $N_i$ and $N_j$ respectively corresponding to the triangles $T_i$ and $T_j$, and the edge $e_{ij}$ connecting both nodes. Here, supposing that a function area (P) for finding the area of a polygon P is defined, a weight value $W(e_{ij})$ of the edge $e_{ij}$ is calculated by the following formula.

[Math 1]

$$W(e) = |\text{area}(T_1) - \text{area}(T_2)| \tag{1}$$

In addition to the area of a polygon forming an image region, the weight of an edge can also be given using a difference in any of various attribute values of an adjacent vertex including the direction of a normal line, and pixel attribute information such as color (an average color of at least one of RBG components) (provided that a polygon mesh has texture).

For example, in an RGB color image having a width w and a height h, let a node of a pixel in an i line and a j row be $V_{i,j}$ and its identification information be $\text{RegID}(V_{i,j}) = i \times w + j$. Each of pixels thereinside has four adjacent nodes, and the total edge count m equals $2wh - w - h$. And a weight between the node $V_{i,j}$ and a node $V_{i',j'}$ can be represented by, e.g., the following formula.

[Math 2]

$$w(E = (V_{i,j}, V_{i',j'})) = \max_{c \in \{R,G,B\}} (|I_c(i,j) - I_c(i',j')|) \tag{2}$$

The image region mesh-growing section 113 extracts image region pairs, sandwiching an edge, in sorted order of the edges, to perform mesh growing. Since edges are given a weight serving as an index of similarity between the image regions connected through edges, performing mesh growing in increasing order of the weights amounts to executing mesh growing preferentially between similar image regions.

The image region mesh-growing section 113 judges whether each pair of image regions connected through an edge extracted in sorted order of the edges should be merged or not on the basis of the statistical processing algorithm. Specifically, if the weight of an edge is calculated on the basis of the area information as shown in the above formula (1), when two image regions Rk and Rl connected through an edge satisfy a predicate based on the following statistical algorithm, it is judged that the image regions Rk and Rl should be merged. In the following formula, it is supposed that the image region Rk has an area Sk and is formed from nk polygons, and that the image region Rl has an area Sl and is formed from nl polygons. It is also supposed that A is the largest one of polygon areas and that Q is a parameter for controlling segmenting coarseness.

[Math 3]

$$\left| \frac{S_k}{n_k} - \frac{S_l}{n_l} \right|^2 \le \frac{A^2(n_k \log n_k + n_l \log n_l)}{Q} \left( \frac{1}{n_k} + \frac{1}{n_l} \right) \tag{3}$$

The above predicate (3) represents a phenomenon occurring in the areas of polygons forming an image region. It is derived from a statistical concentration in equality. This phenomenon is common as a central limit theorem in the field of statistics (even when a population exhibits an arbitrary distribution, if the size of samples in the population is increased, averages of the samples converge into a normal distribution.)

"Q" on the right side of the above formula is a parameter for controlling segmenting coarseness. A larger Q decreases the value of the right side to make it difficult to satisfy the predicate, whereby to suppress the merging of the image regions. Conversely, a smaller Q increases the value on the right side to easily satisfy the predicate, whereby to promote the merging of the image regions to obtain a coarser mesh segmentation result.

Alternatively, if the weight of an edge is calculated on the basis of the RGB color information as shown in the above formula (2), when the adjacent nodes $V_{i,j}$ and $V_{i',j'}$ connected through the edge satisfy the following predicate based on the statistical algorithm, it is judged that the nodes should be merged.

[Math 4]

$$\max_{c \in \{R,G,B\}} (\bar{I}_c(i,j) - \bar{I}_c(i',j')) \le b(n_{i,j}) + b(n_{i',j'}) \tag{4}$$

However, in the above formula, a function b(x) is represented as follows. In the following formula, $n_{i,j}$ and $n_{i',j'}$ are pixel counts contained in the corresponding nodes. Also, Q is a parameter for controlling segmenting coarseness.

[Math 5]

$$b(x) = \frac{256^2}{2Qx} (\min(256, x) \log x + 2 \log 6wh) \tag{5}$$

A node is initially a pixel or a polygon being the smallest unit of a polygon mesh, which forms a digital image. However, as the image region merge processing proceeds, the node grows into an image region formed from a polygon mesh including a plurality of polygons. The node statistical information has, for each node $N_i$, a record for holding the identification information $\text{id}(N_i)$, the area ($N_i$) of the associated image region (initially a single polygon), the polygon count $n(N_i)$ (initial value set to 1) being the number of polygons forming the associated image region, i.e., polygon mesh, and the like. And the image region mesh-growing section 113 gives, when nodes are merged each other, a new id for identifying the new node, and then calculates the area and polygon count of an image region newly produced by the merging, to update the node statistical information. To produce new identification information, Union-Find algorithms can be used. As to the Union-Find algorithms, see, e.g., T. H. Cormen, C. E. Leiserson, R. L. Rivest, "Data Structures for Disjoint Sets" (Chapter 22, pp. 440-461, Introduction to Algorithms).

The small region merging section 114 merges any small region remaining as a result of merge processing performed on image regions. For example, a small polygon mesh left unmerged either between large image regions or inside a large image region is merged with any of its adjacent image regions, independently of whether or not the predicate is satisfied, such that the resultant image region looks nicer. A small region herein used means, e.g., a polygon mesh whose area is less than several percent of the entire mesh surface.

Figure 11:
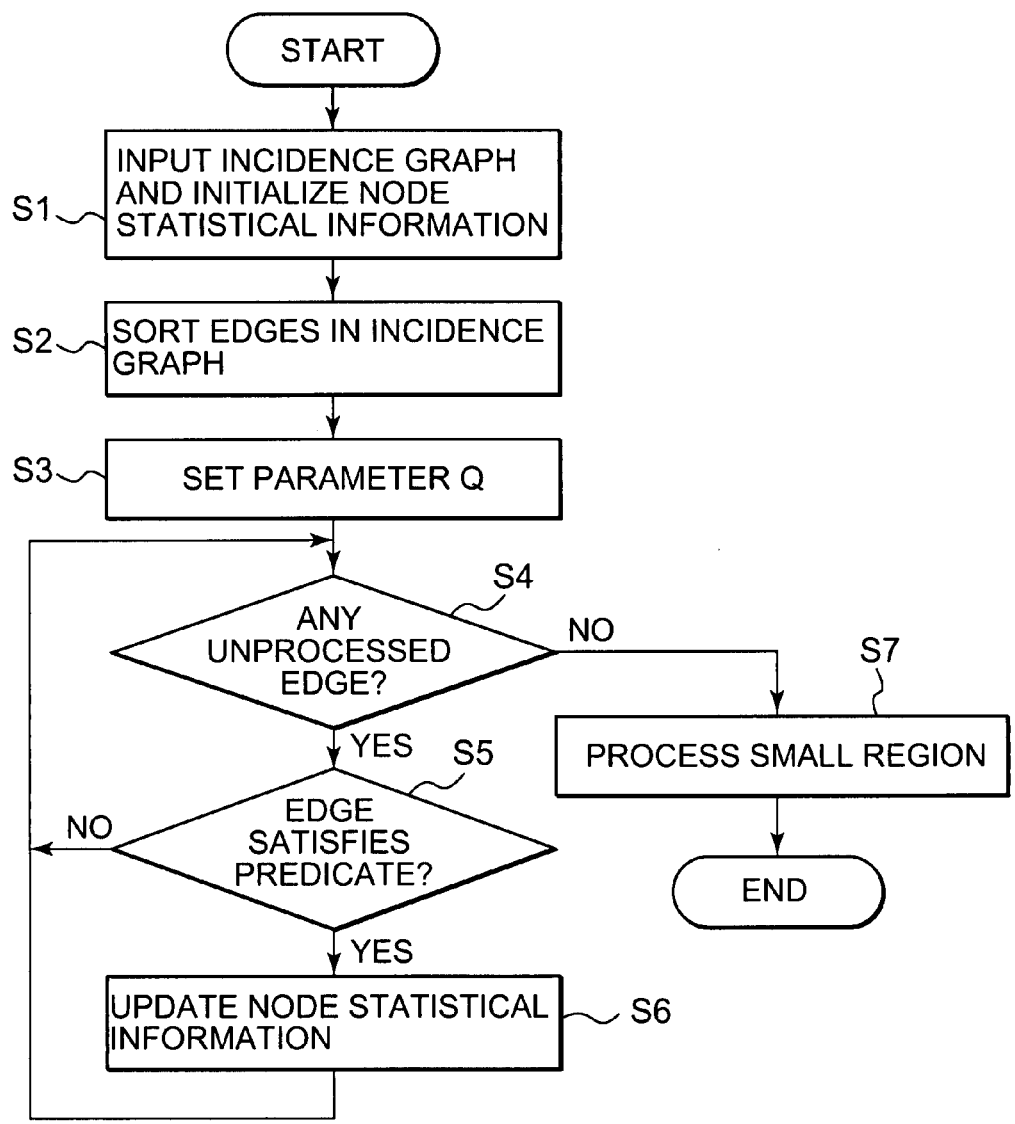
FIG. 11 is a flowchart showing a procedure for mesh segmenting processing performed in the image segmenting unit 11.

FIG. 11 shows an example of a procedure for mesh segmenting processing performed by the image segmenting unit 11 in the form of a flowchart.

First, the image information editing section 111 edits the image information of a three-dimensional object for processing (step S1). In the present embodiment, the image information is described in the form of an incidence graph in which a polygon is used as a node and a side of the polygon is used as an edge (see the earlier description and FIG. 3).

The image information editing section 111 scans the inputted incidence graph to give each node $N_i$ its identification information $\text{id}(N_i)$, and also finds an area of the corresponding polygon, to register (initialize) the identification information, area and polygon count (initial value set to 1) for each node in the node statistical information. Pseudo program codes for initializing the node statistical information are shown below, where id ( ) is an array for storing the identification information of a node denoted by an argument, area( ) is an array for storing an area of the node having the identification information denoted by the argument, and n( ) is an array for storing a polygon count forming node of the identification information denoted by the argument.

[Math 6]

$$id(N_i) = i$$

$$area(i) = area(T_i)$$

$$n(i) = 1 \qquad (6)$$

For a node $N_i$ extracted as an i node from the incidence graph, i is substituted into the identification information $id(N_i)$, the area $(T_i)$ of a polygon is substituted into the area (i) of the node $N_i$, and initial value 1 is substituted into the polygon count n(i).

Next, the incidence graph evaluating section 112 evaluates an each edge in the inputted incidence graph for sorting (step S2). Specifically, a difference between the areas of image regions connected through the edge is given as a weight of the edge, and the image regions are sorted in increasing order of the weights. The smaller the difference between the areas of image regions is, the smaller the weight value is, and the higher the processing priority in the subsequent image merge processing is.

Then, the parameter setting section 115 sets the parameter Q for controlling segmenting coarseness (step S3).

The image region mesh-growing section 113 extracts a pair of image regions sandwiching the edge, in sorted order of the edges (step S4). And mesh growing is performed on the basis of whether or not these image regions satisfy the predicate based on the statistical algorithm (step S5). The predicate used here is one derived from statistical concentration inequality being the phenomenon occurring in the areas of the polygons forming the image region (mentioned earlier). The parameter Q set in step S3 is used in the predicate.

The node statistical information has, for each node $N_i$, a record for holding the identification information $id(N_i)$, the area $(N_i)$ of the associated image region (initially a single polygon), the polygon count $n(N_i)$ (initial value set to 1) being the number of polygons forming the associated image region, i.e., polygon mesh, and the like (mentioned earlier). The image region mesh-growing section 113 gives, when the image regions are merged into a new node, a new id for identifying the new node, and then calculates the area and polygon count of the image region newly produced by the merging, to update processing of the node statistical information (step S6).

The pseudo program codes for merging image regions and thereafter updating the node statistical information are shown below, where Merge( ) is a function for merging and processing each image region denoted by an argument.

[Math 7]

$$Merge(N_i, N_j)$$

$$id'(N_i) = id'(N_j)$$

$$area(id'(N_i)) = area(id(N_i)) + area(id(N_j))$$

$$n(id'(N_i)) = n(id(N_i)) + n(id(N_j))$$

$$id(N_i) \leftarrow id'(N_i)$$

$$id(N_j) \leftarrow id'(N_j) \qquad (7)$$

First, mesh growing is performed on nodes $N_i$ and $N_j$ denoted by an argument of the Merge function. Then, by giving the same new identification information $id'(N_i) = id'(N_j)$ to the respective nodes $N_i$ and $N_j$, both image regions are merged, to indicate that a new node is produced. In the present embodiment, the old identification information about either $N_i$ or $N_j$ is used as the identification information about the new node. In giving the identification information to the new node, the Union-Find algorithms (mentioned earlier) devised by Robert Endre Tarjan can be used.

Then, a sum, $area(id(N_i)) + area(id(N_j))$, of the areas of the respective source image regions is substituted into an $area(id'(N_i))$ of the new node, and also a sum, $n(id(N_i)) + n(id(N_j))$, of the polygon counts of the respective source image regions is substituted into a polygon count $n(id'(N_i))$ of the new node. And by giving new identification information $id'(N_i)$ and $id'(N_j)$ to the source nodes $N_i$ and $N_j$, respectively, the updating of the node statistical information ends.

And when the processing is completed for all the edges in the incidence graph (step S4), the small region merging section 114 merges any small region remaining as a result of the merge processing performed on the image regions (step S7). For example, a small polygon mesh left unmerged between large image regions or inside a large image region is merged with any of its adjacent image regions, independently of whether or not the predicate (3) is satisfied, such that the resultant image region looks nicer. A small region herein means, e.g., a polygon mesh whose area is less than several percent of the entire mesh surface.

Since the mesh growing on image regions based on the statistical processing algorithm mentioned above involves simple computation of statistically processing the areas of polygons, high-speed processing can be implemented. For example, some millions of polygons can be processed per second using the typical computation system (mentioned earlier). Furthermore, by adjusting the parameter Q contained in the predicate, a criterion for merging image regions can be set randomly to produce a polygon mesh having a desired coarseness, and thus, the system has scalability.

Figure 12:
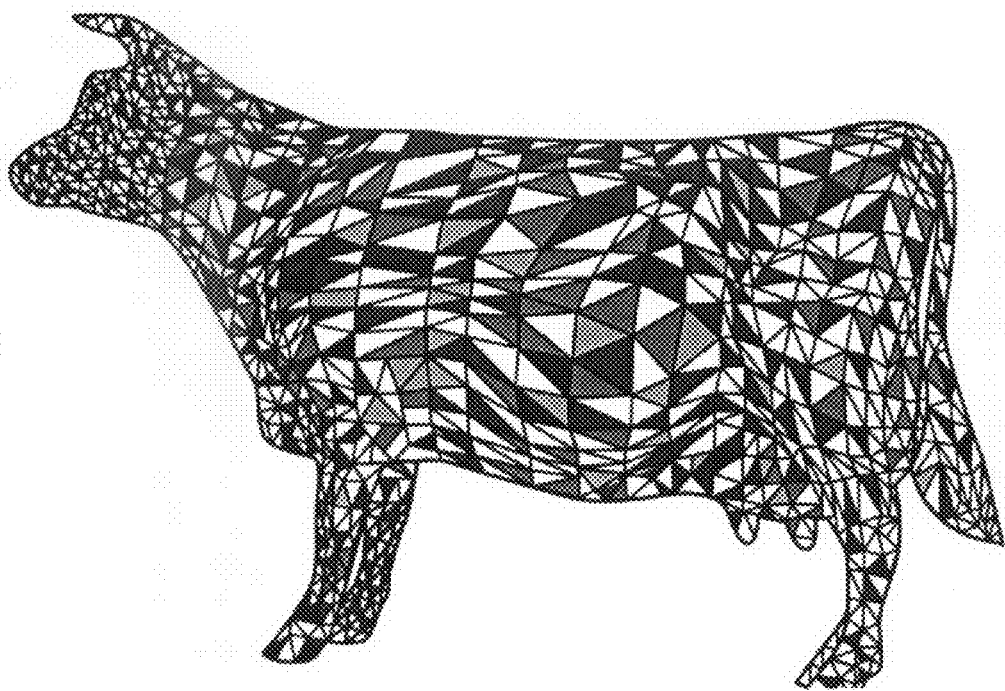
FIG. 12 is a diagram showing an image segmentation result obtained when the merging of image regions is suppressed.
Figure 13:
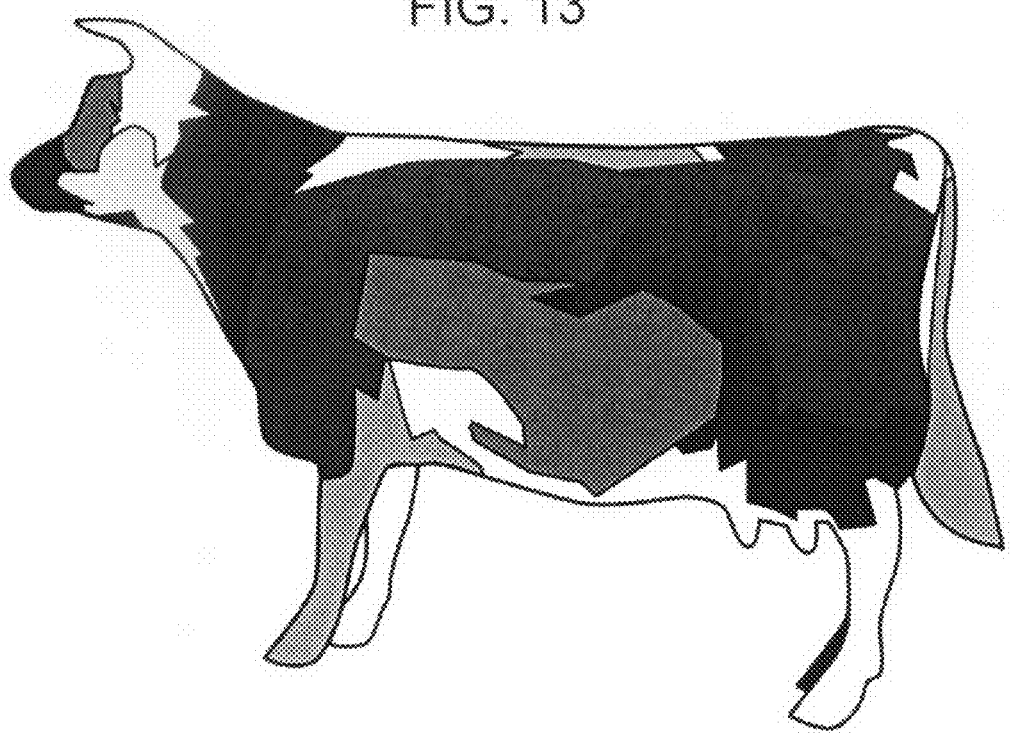
FIG. 13 is a diagram showing an image segmentation result obtained when the merging of image regions is promoted.

A larger Q decreases the value on the right side of the above formula (3), to make it difficult to satisfy the predicate (3), whereby the merging of image regions is suppressed (see FIG. 12). Conversely, a smaller Q increases the value on the right side of the above formula (3), to easily satisfy the predicate, whereby the merging of image regions is promoted to obtain a coarser mesh segmentation result (see FIG. 13).

Thus, according to the image segmentation method of the present embodiment, by setting the proper value of Q in the predicate (3), segmentation can be performed, by which pictures-in-picture regions and a background region contained in a photo image taken are separated from each other. For example, as shown in FIGS. 3 and 5, pictures-in-picture objects having texture regions, such as business cards, book covers, and/or CD/DVD labels contained in photo image, can be extracted from a source image by image segmentation.

Figure 14:
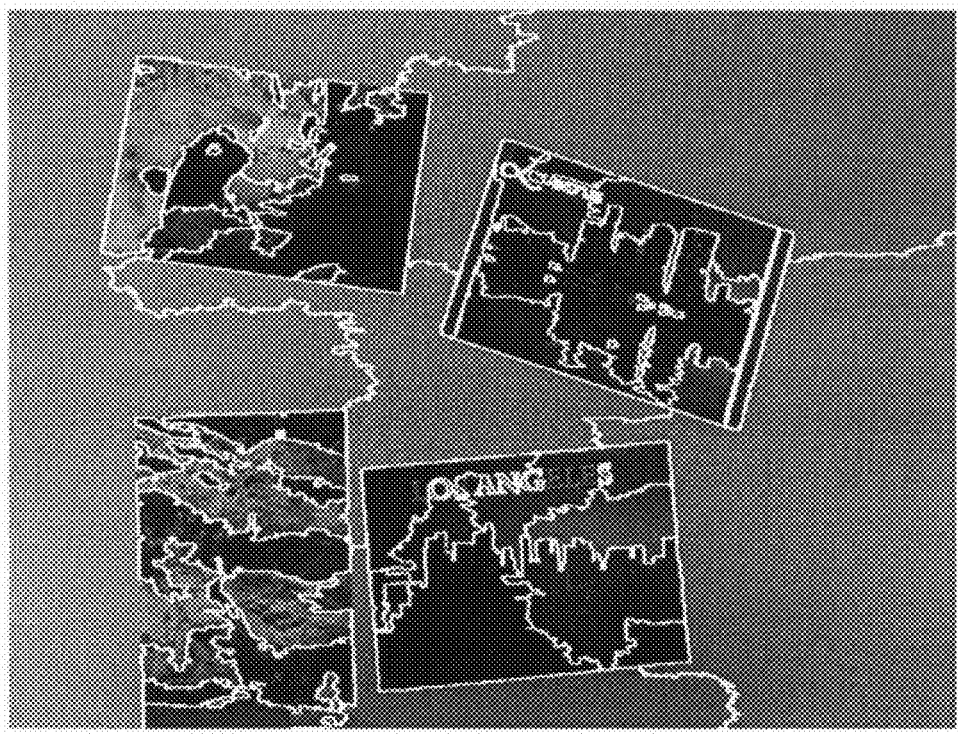
FIG. 14 is a diagram showing a failure in image-segmenting a photo formed from complicated semantics.

However, if pictures in picture have complicated texture, or if a background on which the pictures in picture are placed has texture, pictures-in-picture regions are also segmented to lose its single body, or the background is also segmented to be undistinguished from the pictures-in-picture regions. Hence, it is difficult to extract only a desired pictures-in-picture regions by separation. For example, when a photo formed from complicated semantics is image-segmented, a region is not extracted as a single picture in picture, but is further segmented into a plurality of regions as shown in FIG. 14, and the image segmentation ends in failure.

In the present embodiment, in order to accurately process a background formed from complicated texture, it is configured to perform "two-step segmentation" in which segmentation processing for exporting a foreground region including individual pictures in picture from a source image, and segmentation processing for exporting a background region other than the pictures-in-picture from the source image, are performed in a two-step manner. Furthermore, a color edge image is used in the two-step segmentation, which can be obtained by differential-filtering a source image.

FIG. 15 shows an overview processing procedure for performing two-step image segmentation in the form of a flowchart.

First, a color edge image is obtained from a source image by differential filtering (step S11).

Next, image segmentation processing shown in FIG. 11 is performed (step S12) after a partial graph is created.

As mentioned already, in the initial state of an incidence graph, nodes are individual pixels in a two-dimensional image, and any adjacent nodes are connected through an edge. And, judgment is made on a weight given to each edge using the predicate based on the statistical processing algorithm, and by repeating merging of the nodes, the image segmentation proceeds. In step S12, in a differential-filtered color edge image, a partial incidence graph is created by giving, only to a pixel whose edge color frequency band is less than a predetermined value (e.g., not falling under the contour of a pictures-in-picture region or of a texture region), an edge for connecting with another pixel. No adjacent pixels could be merged without an edge, and thus the image segmentation proceeds with such adjacent pixels left separated.

When the image segmentation ends, a small region having ten pixels or less is merged with any of its surrounding regions (step S13).

Figure 16A:
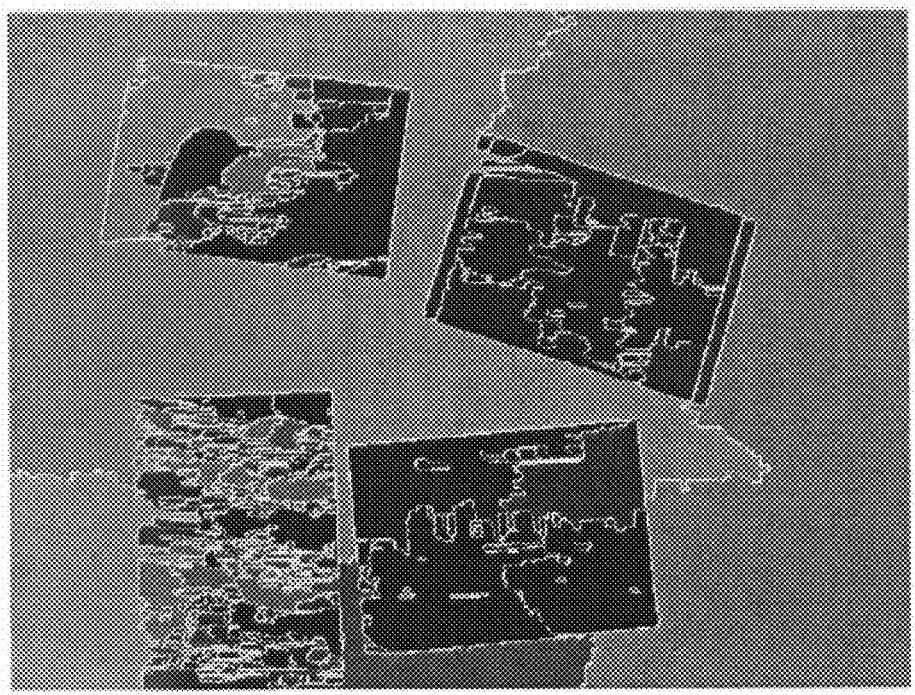
FIG. 16A is a diagram showing a state in which a background is segmented into some regions.
Figure 16B:
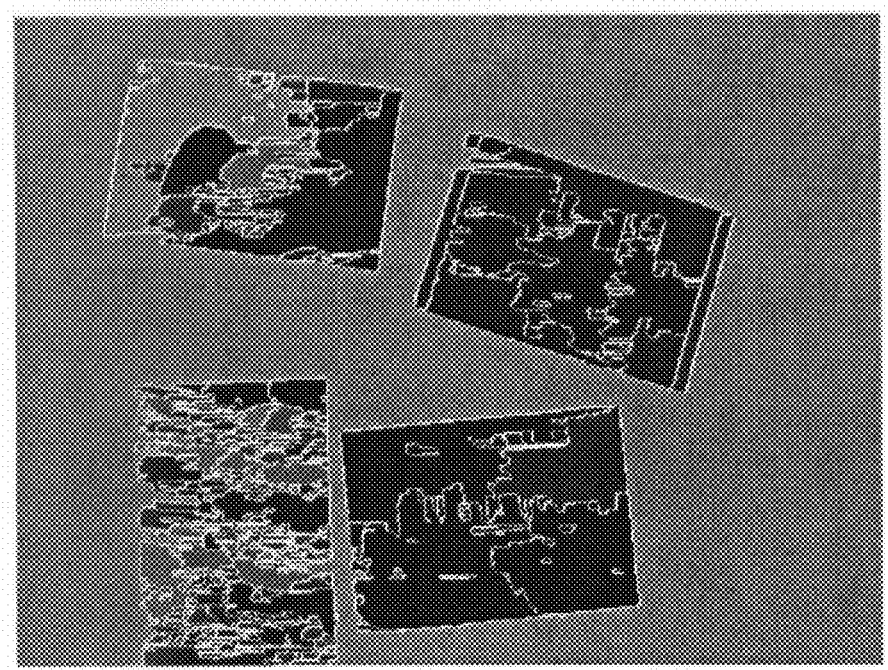
FIG. 16B is a diagram showing a state in which the background shown in FIG. 16A is merged into a single region.

When the image segmentation processing in steps S12 and S13 ends, some of the regions on the border of the image for processing are merged (step S14). In this processing step, all regions, each touching the border similar to four corner regions of an image, are merged. For example, even if the background is segmented into several regions as shown in FIG. 16A as a result of image segmentation processing, regions on the border are merged, whereby the background is merged into a single region as shown in FIG. 16B.

Then, foreground image regions of pictures in picture are exported (step S15), and also a background image region on which the pictures in picture are placed is exported (step S16).

Figure 17A:
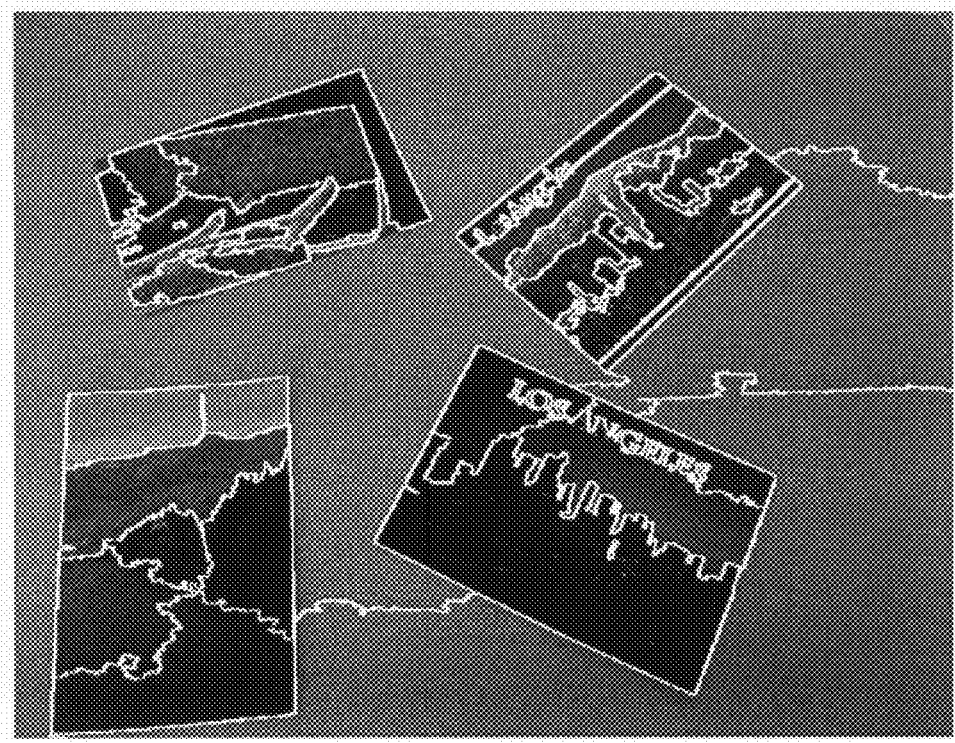
FIG. 17A is a diagram showing a source image obtained by imaging four postcards placed on a background having texture, such as a carpet.

FIGS. 17A to 17G show a specific example to which the two-step image segmentation is applied to an image. A source image shown in FIG. 17A is obtained by imaging four postcards placed on a background having texture, such as a carpet.

Figure 17B:
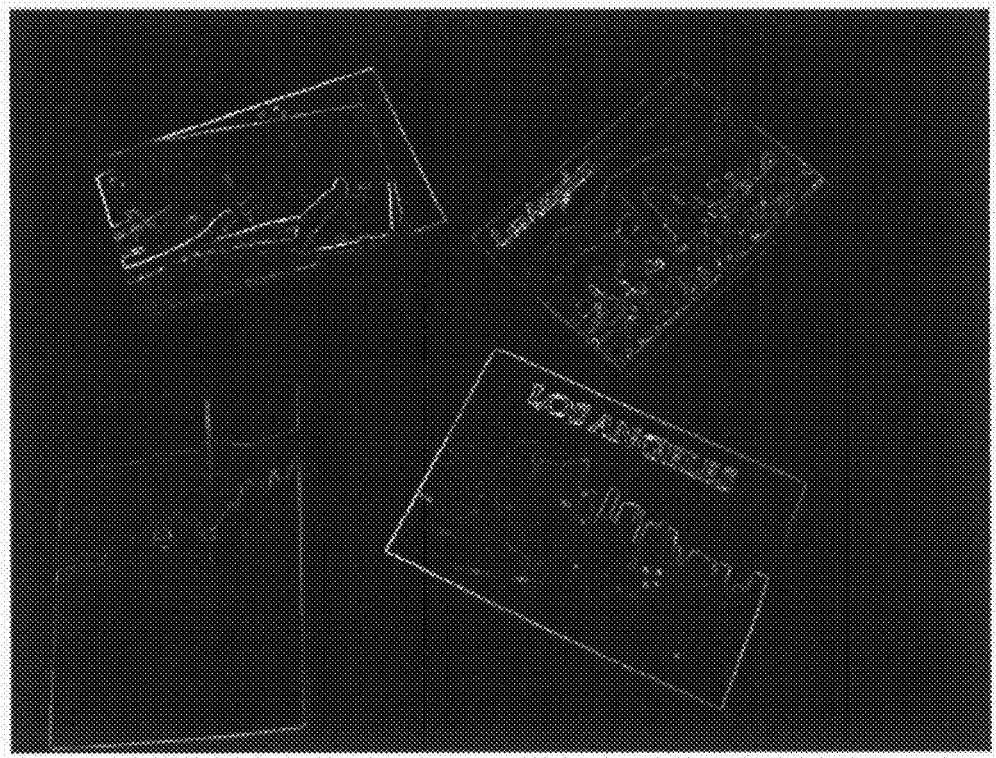
FIG. 17B is a diagram showing an edge color image obtained by differential-filtering the source image shown in FIG. 17A.

FIG. 17B shows an edge color image obtained by differential-filtering this source image. As seen from the example shown in the figure, the contour and picture of each postcard are represented as a high frequency band on the edge color image.

Figure 17C:
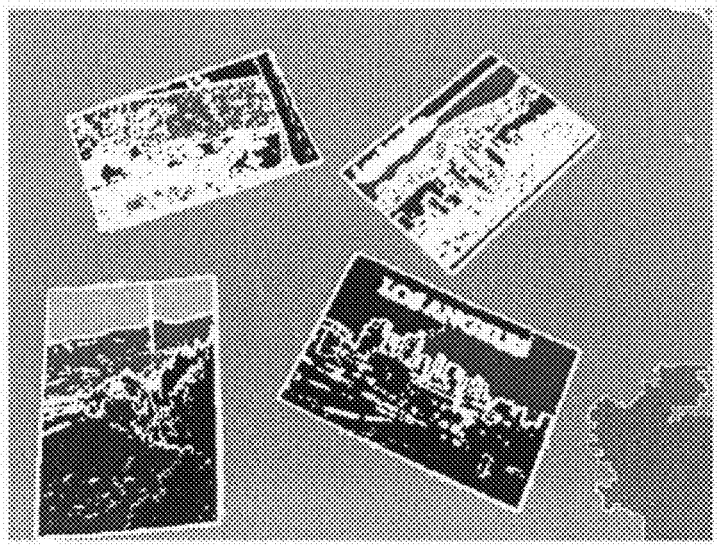
FIG. 17C is a diagram showing a result obtained by image-segmenting a partial incidence graph created by utilizing the edge color image shown in FIG. 17B.
Figure 17D:
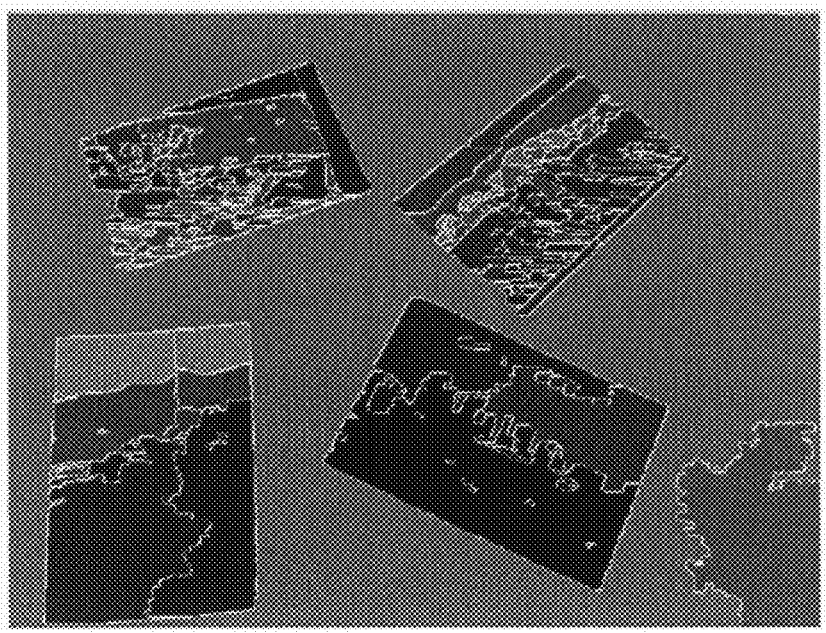
FIG. 17D is a diagram showing a result obtained by further merging a small region in the image shown in FIG. 17C.

FIG. 17C shows a result obtained by creating a partial incidence graph utilizing the edge color image, and then performing image segmentation on the partial incidence graph. Also, FIG. 17D shows a result obtained by further merging small regions. In the partial incidence graph, an edge is given only to a pixel not falling under the contour of a region such as a picture in picture or texture. In other words, even by repeating mesh growing on nodes in accordance with the statistical processing algorithm, regions are not merged across a contour as seen from FIG. 17D, and thus the contour of a region such as a picture in picture or texture is left as it is.

Figure 17E:
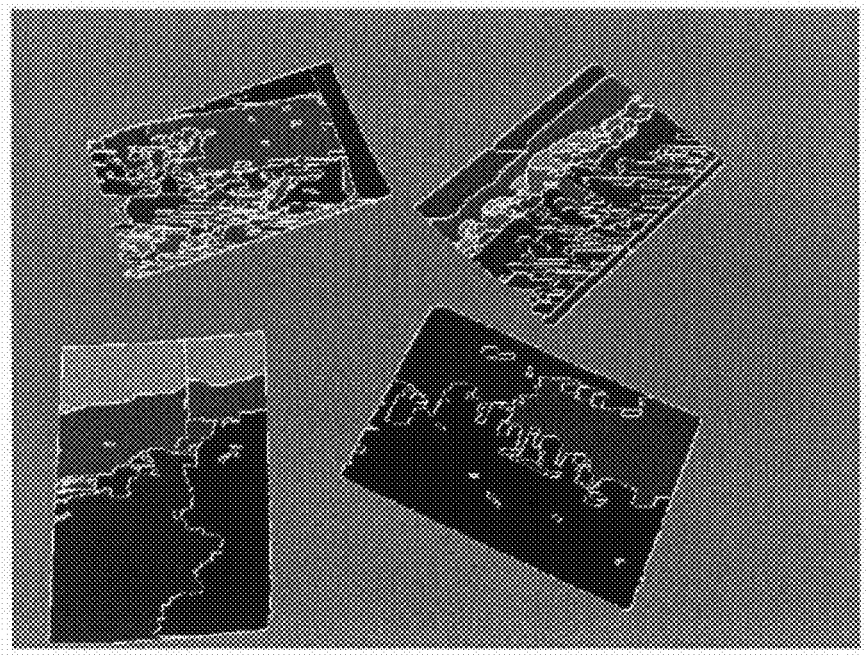
FIG. 17E is a diagram showing a result obtained by merging some of regions on the image border shown in FIG. 17D.

FIG. 17E shows a result obtained by merging regions on the border of the image for processing. Even if the background is segmented into some regions as shown in FIG. 17D, by merging the regions on the border, the background is merged into a single region.

Figure 17F:
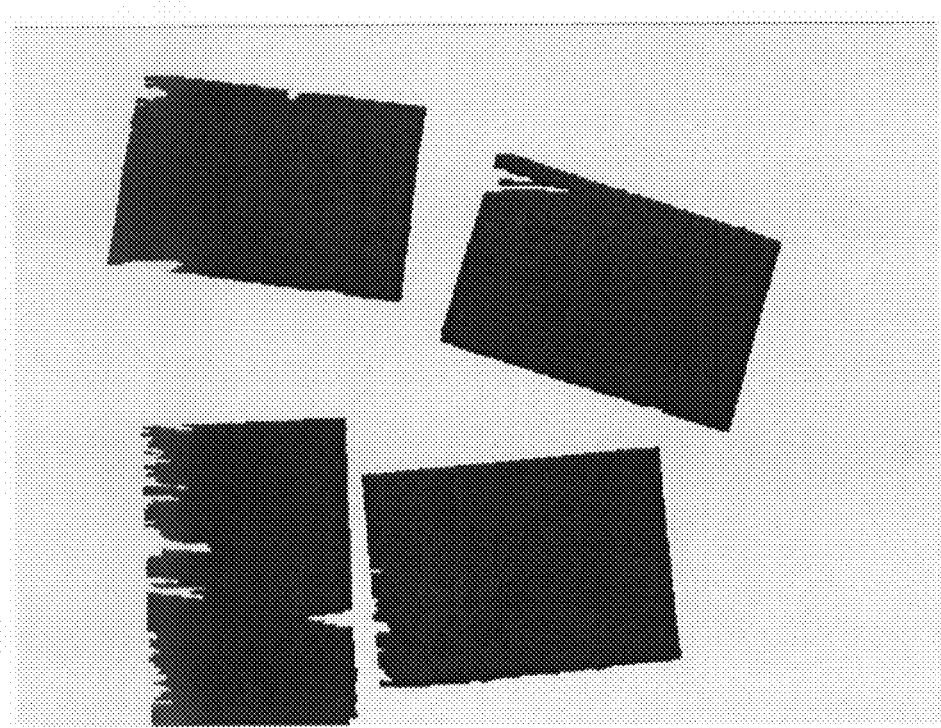
FIG. 17F is a diagram showing a result obtained by exporting foreground image regions such as pictures in picture from the image shown in FIG. 17D.
Figure 17G:
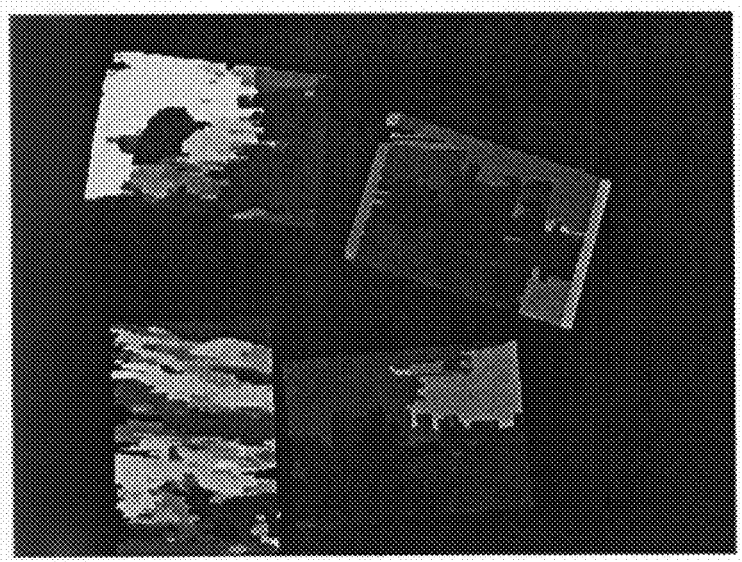
FIG. 17G is a diagram showing a result obtained by exporting a background image region from the image shown in FIG. 17D.

FIG. 17F shows a result obtained by exporting the foreground image regions such as the pictures in picture from the image shown in FIG. 17D. Also, FIG. 17G shows a result obtained by exporting the background image region from the image shown in FIG. 17D.

Extracting Regions

Figure 18:
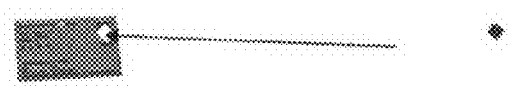
FIG. 18 is a diagram showing a state in which the outermost contour of a business card as a picture in picture contains therein a small region formed from a contour surrounding a logo printed on the business card.

After having performed image segmentation processing, further other small regions may be contained in any resultant segmented region. In an example of FIG. 18, in the outermost contour of a business card as a picture in picture, a small region is contained, which is formed from a contour surrounding a logo printed on the business card. However, as is apparent from the figure, a small region contained in another region is basically just an individual content contained in pictures-in-picture information, and thus only a region defined by the outermost contour needs to be considered. Hence, in extracting a region, such a small region is discarded.

In extracting a region from an image-segmented image, first, the image is scanned along both horizontal and vertical scanning lines, to detect closed contours. Then, the image is updated by applying a flood fill algorithm to the individual closed contours. Thereafter, only a region object formed from the outermost contour is extracted.

If two-step image segmentation such as mentioned above is to be performed, all the regions excluding the background are extracted, to create a set of desired quadrilaterals.

Then, the image is scanned for the individual quadrilaterals, to apply the flood fill algorithm.

Figure 19A:
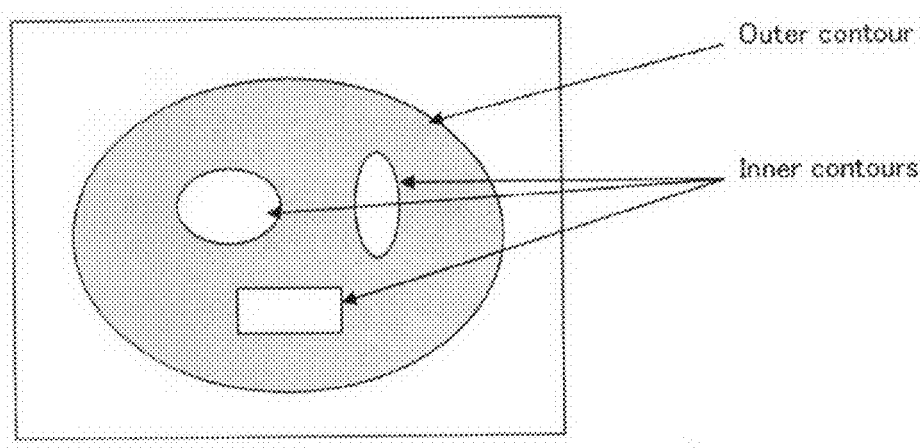
FIG. 19A is a diagram for explaining a procedure for region extracting processing using a flood fill algorithm.
Figure 19B:
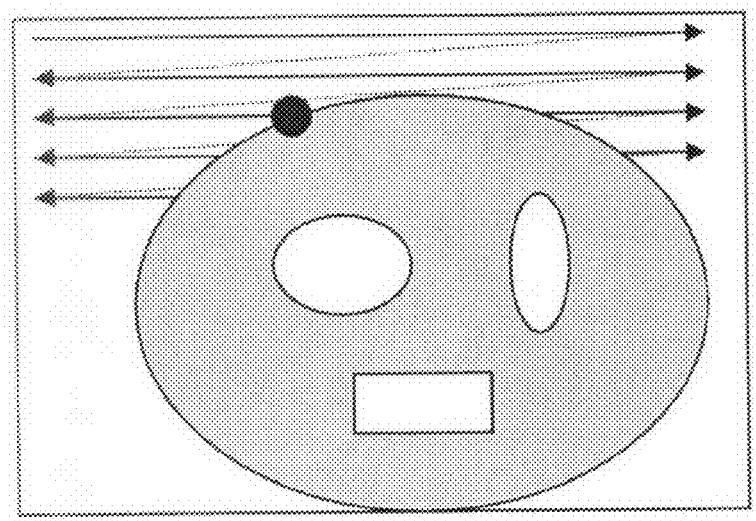
FIG. 19B is a diagram for explaining a procedure for the region extracting processing using the flood fill algorithm.
Figure 19C:
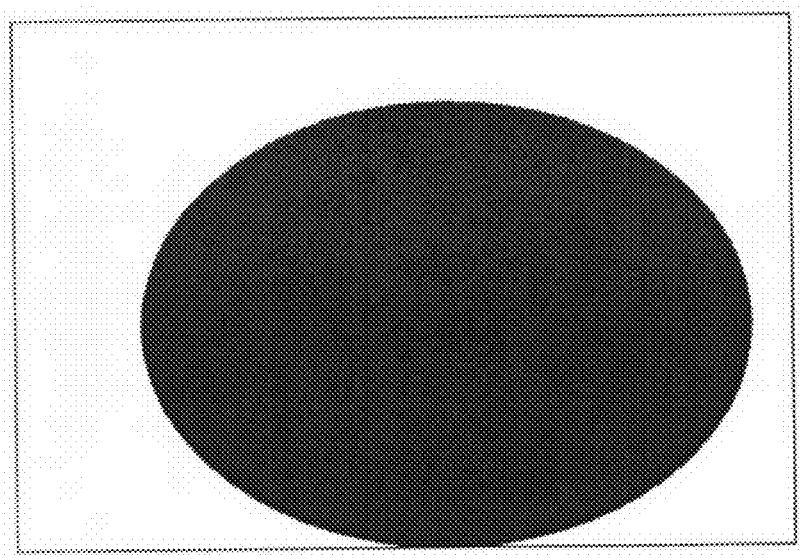
FIG. 19C is a diagram for explaining a procedure for the region extracting processing using the flood fill algorithm.

FIGS. 19A to 19C illustrate a procedure for region extracting processing using the flood fill algorithm. Here, as shown in FIG. 19A, a plurality of regions defined by small contours (inner contours) are contained in a region defined by the outermost contour (outer contour).

As shown in FIG. 19B, by scanning the image along the horizontal and vertical scanning lines, a region defined by the outermost contour is detected.

Here, a region defined by the outermost contour is extracted, and then the flood fill algorithm is applied thereto such that a region defined by the inner contours will not be extracted by mistake as shown in FIG. 19C.

Note that for details of the flood fill algorithm, see, e.g., Frank Nielsen, "Visual Computing: Geometry, Graphics, and Vision" (Charles River Media, ISBN: 1-58450-427-7, 2005, Chapter 2, page 26).

Finding Quadrilaterals

Figure 20A:
FIG. 20A is a diagram for explaining a procedure for finding quadrilateral region.
Figure 20B:
FIG. 20B is a diagram for explaining a procedure for finding quadrilateral region.

When an almost quadrilateral region is detected from the outermost contour, if this region is a modified rectangle as viewed perspectively (see FIG. 20A), image conversion is performed such that this region becomes an image viewed from the front (see FIG. 20B). The reason why the region is converted into a front view image is that man is generally inclined to view a flat surface using two cameras, active lighting (a projector or hologram AF) and the like.

Figure 21:
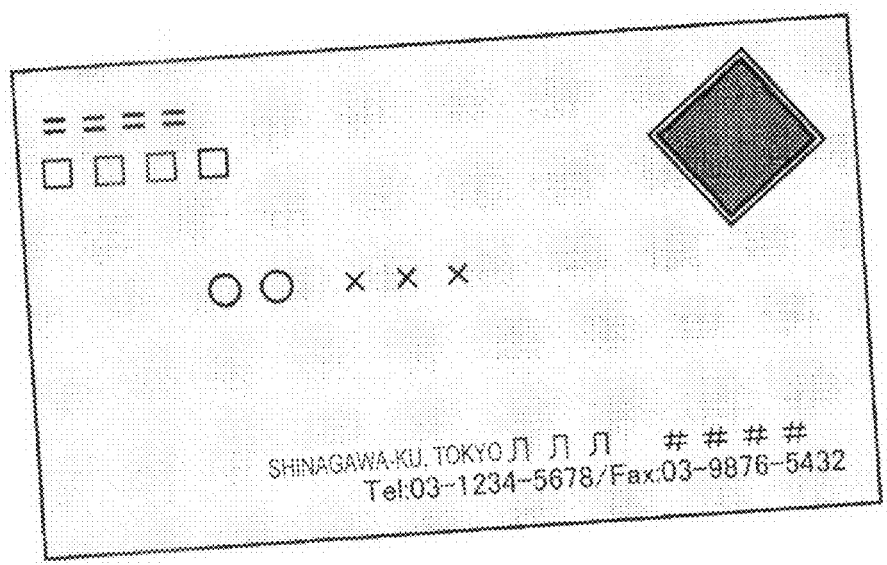
FIG. 21 is a diagram for explaining a procedure for judging whether the outermost contour is quadrilateral or not.

In extracting the outermost contour, it is judged whether that contour is quadrilateral. Specifically, as to each pixel forming the contour for processing, the inclinations of their tangents are calculated for chopping in units of 5 degrees, whereby to identify two main inclinations (directions) (see FIG. 21).

Figure 22:
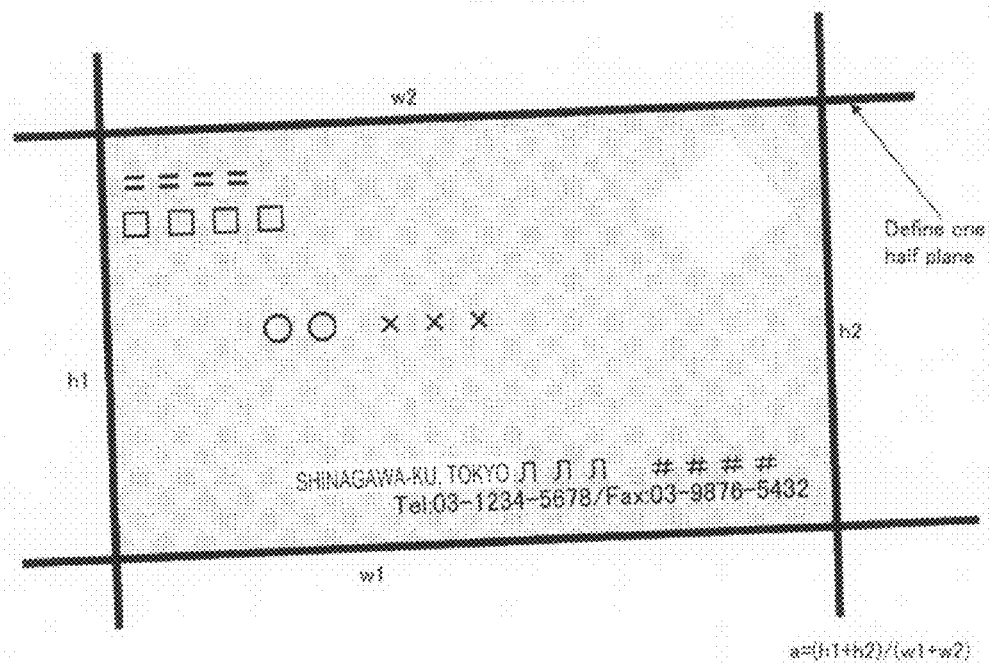
FIG. 22 is a diagram for explaining a procedure for judging whether the outermost contour is quadrilateral or not.

The pixels on the border of the contour are grouped into four sets in accordance with the inclinations of their tangents, and then line regression is performed for each set. Then, a quadrilateral is detected as a region where four half planes intersect (see FIG. 22).

Alternatively, as a substitute technique for finding quadrilaterals, a line simplification algorithm by Douglas-Peucker may be applied to extract pixels forming the outermost contour (a closed C4 curve). Note that for details of this line simplification algorithm, see, e.g., http://geometryalgorithms.com/Archives/algorithm_0205/(as of Jul. 27, 2006), John Hershberger and Jack Snoeyink, "Speeding Up the Douglas-Peucker Line-Simplification Algorithm" (Proc 5th Symp on Data Handling, 134-143 (1992)), or the like.

After extracting the quadrilateral in this way, a Hausdorff distance from original line segment is calculated. If the distance is within a predetermined value, the extracted region is accepted as a quadrilateral.

Note that the Hausdorff distance is a known technique for comparing shapes using a scale of distance.

Guessing Aspect Ratios

Finally, inverse projective transformation is performed such that the detected quadrilateral becomes an image viewed from the front, and also its aspect ratio is adjusted.

Many techniques are available for subjecting a rectangular image to inverse projection, and the scope and spirit of the embodiments of the present invention are not limited to any specific technique.

When the aspect ratio is given, only the scale effect may be considered.

For example, an average of aspect ratios is calculated on the basis of a formula a=(h1+h2)/(w1+w2). Also, the closest one is found out from a predetermined set of aspect ratios. For example, an aspect ratio of 10:15 is selected for A4-size paper, photos, and postcards, and an aspect ratio of 5.5:9.1 for business cards (for a picture in picture rotated 90°, its aspect ratio is the inverse of a corresponding one of the above aspect ratios).

A procedure for remapping a rectangular image will be described below.

A dimensional factor s is selected such that a×s2 equals the pixel count within the quadrilateral (where a is the aspect ratio). Alternatively, the dimensional factor is selected such that the distance between two points subjected to inverse projection is within a predetermined value (e.g., 1.0 or 1.414).

The image conversion is called "homography" or "collineaction", and is represented by a 3×3 homogeneous matrix H determined by eight coefficients.

Let a pixel p in the quadrilateral be mapped into a pixel p' whose scale is adjusted using the aspect ratio a. If p and p' are homogeneous coordinates as p=(x, y, z), p'=(x', y', z'), then p'=Hp. If they are not homogenous coordinates, then p'=(x'/w', y'/w').

Figure 23:
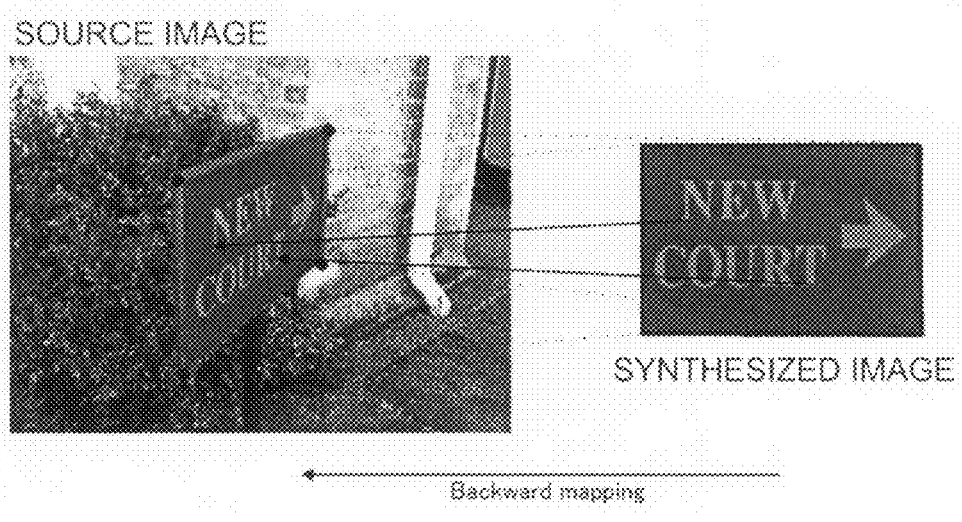
FIG. 23 is a diagram showing how a synthesized image is backward-mapped to a source image.

As shown in FIG. 23, a synthesized image is backward-mapped into a source image. A backward-mapped pixel P is represented as $P=H^{-1}p'$.

Note that for details of backward mapping or the like, it is suggested to refer to, e.g., Frank Nielsen, "Visual Computing: Geometry, Graphics, and Vision" (Charles River Media, ISBN: 1-58450-427-7, 2005, Chapter 3, p. 127, Chapter 4, p. 203).

The present invention has been described above in great detail with reference to the specific embodiment. However, it is self-explanatory that those skilled in the art can make modifications to and substitutions for the embodiment without departing from the scope and spirit of the present invention.

The image processing technology of the present invention can be incorporated into information equipment, such as personal computers that capture photo images from a digital camera to process these images, digital still cameras themselves, or various equipment incorporating therein a digital camera.

According to the image processing technology of the present invention, a plurality of pictures in picture, such as business cards, postcards, and/or book covers contained in a photo image taken by a digital camera, or the like, can be exported as foreground regions by separation from other background region. Also, the individual extracted pictures in picture image can be subjected to inverse projective transformation such that they are imaged from the front, or can have their aspect ratios adjusted, for reconstruction into image objects close to the original pictures in picture. These image objects are reusable as content. Additionally, text contained in picture in picture is character-recognized, so that the obtained textual information can be used to store or arrange the image object, and further used to search information and provide other services, based on textual information.

That is, the present invention has been disclosed by way of examples, and thus should not be construed in a restrictive sense. In order to judge the scope and the spirit of the present invention, the appended claims should be taken into consideration.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for extracting pictures-in-picture information contained in an image, comprising:
   image segmenting means for segmenting an input image into regions; and
   region extracting means for extracting a pictures-in-picture region containing the pictures-in-picture information on basis of a contour of a segmented region,
   wherein the image segmenting means includes:
   an incidence graph creating means for creating an incidence graph in which adjacent nodes are connected by an edge, from an input image formed with nodes, a node being a pixel or a polygon formed from a cluster of pixels;
   a merge processing means for extracting a pair of the nodes sandwiching the edge in sorted order of the edges, and evaluating whether or not the pair of the nodes should be merged on a basis of a statistical processing algorithm, to merge the nodes; and
   a differential processing means for performing differential-processing on the input image,
   wherein the incidence graph creating means assign, to a pixel which frequency band is less than predetermined value in a differentiated image outputted from the differential processing means, an edge for connection with another pixel, to create a partial incidence graph, and
   the merge processing, means merge the nodes on a border or touching thereto to merge the background into a single region, to export the foreground image region including the pictures in picture, and to export the background image region on which the pictures in picture are placed.

2. The image processing apparatus according to claim 1, further comprising:
   quadrilateral detecting means for detecting a quadrilateral from the pictures-in-picture region extracted by the region extracting means; and image converting means for subjecting a detected quadrilateral to inverse projective transformation so as to obtain an image viewed from a front, and adjusting an aspect ratio thereof.

3. The image processing apparatus according to claim 1, wherein the image segmenting means includes:
an incidence graph evaluating means for assigning a weight to the edge on a basis of a result of comparison between attribute values of each node connected by the edge, and sorting the edges in the incidence graph on a basis of their weights,
wherein the input image is segmented into a plurality of image regions respectively formed from the corresponding nodes.

4. The image processing apparatus according to claim 3, further comprising:
small region merging means for merging a small region left behind as a result of the merge processing performed on the image regions by the merge processing means.

5. The image processing apparatus according to claim 3, wherein
the incidence graph evaluating means assign a difference between the attribute values of each node connected by the edge in the incidence graph as the weight of the edge, and sorts the edges by weight in increasing order.

6. The image processing apparatus according to claim 3, wherein
the merge processing means judge whether or not the nodes connected by the edge in the incidence graph should be merged on a basis of a predicate derived from a phenomenon of concentration inequality in areas of image regions forming the nodes.

7. The image processing apparatus according to claim 3, wherein
the image segmenting means perform first image segmenting processing for exporting a foreground region including individual pictures in picture from a source image, and second image segmenting processing for exporting a background region excluding the pictures in picture from the source image, in a two-step manner.

8. The image processing apparatus according to claim 1, wherein
the region extracting means discard a small region contained in another region, and extracts a region formed from an outermost contour.

9. An image processing method performed by an image processing apparatus for extracting pictures-in-picture information contained in an image, comprising the steps of:
image segmenting an input image into regions, utilizing an image segmentation unit; and
region extracting a pictures-in-picture region containing the pictures-in-picture information on a basis of a contour of a segmented region, utilizing a region extraction unit,
wherein the image segmenting step includes:
an incidence graph creating step of creating an incidence graph in which adjacent nodes are connected through an edge, from the input image formed with nodes, a node being a pixel or a polygon formed from a cluster of pixels, utilizing an incidence graph creating unit;
a mesh-growing step of extracting a pair of nodes sandwiching an edge in sorted order of the edges, and evaluating whether or not the pair of nodes should be merged on a basis of a statistical processing algorithm, to mesh-grow the nodes, utilizing a merge processing unit, and
a differential processing step of differential-processing the input image, utilizing a differential processing unit,
wherein the incidence graph creating step gives, only to a pixel belonging to a frequency band which is less than a predetermined value in a differentiated image obtained in the differential processing step, an edge for connection with another pixel, to create a partial incidence graph, and
the mesh-growing step mesh-grows nodes on a border to merge the background into a single region, to export the foreground image region including the pictures in picture, and to export the background image region on which the pictures in picture are placed.

10. The image processing method according to claim 9, further comprising:
a quadrilateral detecting step of detecting a quadrilateral from the pictures-in-picture region extracted in the region extracting step; and
an image converting step of subjecting the detected quadrilateral to inverse projective transformation into an image viewed from a front, and adjusting an aspect ratio thereof.

11. The image processing method according to claim 9, wherein the image segmenting step includes:
an incidence graph evaluating step of giving the edge a weight on a basis of a result of comparison between attribute values of each node connected through the edge, and sorting edges in the incidence graph on a basis of the corresponding weights,
wherein the input image is segmented into a plurality of image regions formed from individual nodes.

12. The image processing method according to claim 11, further comprising:
a small region merging step of merging a small region remaining as a result of the mesh growing performed on the image regions in the mesh-growing step.

13. The image processing method according to claim 11, wherein
the incidence graph evaluating step gives a difference between attribute values of each node connected through the edge in the incidence graph as a weight of the edge, and sorts weights in increasing order.

14. The image processing method according to claim 11, wherein
the image region mesh-growing step judges whether or not the nodes connected through the edge in the incidence graph should be merged on a basis of a predicate derived from a phenomenon of concentration inequality in areas of image regions forming the nodes.

15. The image processing method according to claim 11, wherein
the image segmenting stepper forms first image segmenting processing for exporting a foreground region including individual pictures in picture from a source image, and second image segmenting processing for exporting a background region excluding the pictures in picture from the source image, in a two-step manner.

16. The image processing method according to claim 9, wherein
the region extracting step discards a small region containing another region, and extracts only a region formed from an outermost contour.

17. A computer-readable non-transitory medium for storing a computer-executable program for extracting pictures-in-picture information contained in an image on a computer, the program causing the computer to execute:
an image segmenting processing for segmenting an input image into regions;

a region extracting processing for extracting a pictures-in-picture region containing the pictures-in-picture information on a basis of a contour of a segmented region;

a quadrilateral detecting processing for detecting a quadrilateral from the pictures-in-picture region extracted in the region extracting procedure; and an image converting processing for subjecting the detected quadrilateral to inverse projective transformation into an image viewed from a front, and adjusting an aspect ratio thereof, wherein the image segmenting processing includes:

an incidence graph creating processing of creating an incidence graph in which adjacent nodes are connected through an edge, from the input image formed with nodes a node being a pixel or a polygon formed from a cluster of pixels;

a mesh-growing processing of extracting a pair of nodes sandwiching an edge in sorted order of the edges, and evaluating whether or not the pair of nodes should be merged on a basis of a statistical processing algorithm, to mesh-grow the nodes, and a differential processing processing of differential-processing the input image, wherein the incidence graph creating processing gives, only to a pixel belonging to a frequency band which is less than a predetermined value in a differentiated image obtained in the differential processing processing, an edge for connection with another pixel, to create a partial incidence graph, and the mesh-growing processing mesh-grows nodes on a border to merge the background into a single region, to export the foreground image region including the pictures in picture, and to export the background image rggion on which the pictures in picture are placed.

18. An image processing apparatus, including a hardware processor, for extracting pictures-in-picture information contained in an image, comprising:

an image segmentation unit segmenting an input image into regions; and a region extraction unit extracting a pictures-in-picture region containing the pictures-in-picture information on a basis of a contour of a segmented region, wherein the image segmenting unit includes:

an incidence graph creating unit creating an incidence graph in which adjacent nodes are connected by an edge, from an input image formed with nodes, a node being a pixel or a polygon formed from a cluster of pixels;

a merge processing unit extracting a pair of the nodes sandwiching the edge in sorted order of the edges, and evaluating whether or not the pair of the nodes should be merged on a basis of a statistical processing algorithm, to merge the nodes; and a differential processing unit performing differential-processing on the input image, wherein the incidence graph creating unit assigns, to a pixel which frequency band is less than a predetermined value in a differentiated image outputted from the differential processing unit, an edge for connection with another pixel, to create a partial incidence graph, and the merge processing unit merges the nodes on a border or touching thereto to merge the background into a single region, to export the foreground image region including the pictures in picture, and to export the background image region on which the pictures in picture are placed.

* * * * *